US012768752B2

United States Patent

(12) United States Patent
Ito

(10) Patent No.: US 12,768,752 B2
(45) Date of Patent: Oct. 20, 2026

(54) METHOD FOR PREPARING FLOW PATH DEVICE

(71) Applicant: KYOCERA CORPORATION, Kyoto (JP)

(72) Inventor: Yu Ito, Omihachiman (JP)

(73) Assignee: KYOCERA CORPORATION, Kyoto (JP)

(*) Notice: Subject to any disclaimer, the term of this patent is extended or adjusted under 35 U.S.C. 154(b) by 238 days.

(21) Appl. No.: 18/836,355

(22) PCT Filed: Feb. 3, 2023

(86) PCT No.: PCT/JP2023/003587
§ 371 (c)(1),
(2) Date: Aug. 7, 2024

(87) PCT Pub. No.: WO2023/153331
PCT Pub. Date: Aug. 17, 2023

(65) Prior Publication Data

US 2025/0137891 A1 May 1, 2025

(30) Foreign Application Priority Data

Feb. 8, 2022 (JP) ................................ 2022-018041

(51) Int. Cl.
*G01N 1/14* (2006.01)
*G01N 15/01* (2024.01)
*G01N 15/14* (2006.01)

(52) U.S. Cl.
CPC ......... *G01N 1/14* (2013.01); *G01N 2015/016* (2024.01); *G01N 15/14* (2013.01); *G01N 2015/1486* (2013.01)

(58) Field of Classification Search
CPC .... G01N 1/14; G01N 15/14; G01N 2015/016; G01N 2015/1486; G01N 2015/1006;
(Continued)

(56) References Cited

U.S. PATENT DOCUMENTS 11,346,787 B2 * 5/2022 Tanaka ............... G01N 21/8483
12,611,672 B2 * 4/2026 Uehara ............. B01L 3/502761
(Continued)

FOREIGN PATENT DOCUMENTS

CN 115003786 A * 9/2022 ........ B01L 3/502761
WO 2021193265 A1 9/2021

*Primary Examiner* — Francis C Gray
(74) *Attorney, Agent, or Firm* — HAUPTMAN HAM, LLP

(57) ABSTRACT

A method for preparing a flow path device includes a first process and a second process. The flow path device includes a flow path portion and a plurality of holes each being continuous with the flow path portion. The flow path portion includes a first flow path and a plurality of second flow paths. In the first process, a liquid feeder is connected to a first inlet hole, and a liquid suction unit is connected to a second outlet hole. In the second process, a liquid is sucked, with the liquid suction unit, from the first flow path through the plurality of second flow paths and the second outlet hole at a first suction rate being lower than or equal to a first feed rate while the liquid is being fed, with the liquid feeder, toward the first flow path through the first inlet hole at the first feed rate.

12 Claims, 14 Drawing Sheets

(58) Field of Classification Search

CPC ........... G01N 15/1459; G01N 15/1484; G01N 1/4077; G01N 37/00; G01N 33/487; B01L 2200/0684; B01L 2400/049; B01L 3/502707; B01L 2200/0652; B01L 2300/0816; B01L 2300/0864; B01L 2300/0874; B01L 2300/0887; B01L 3/502753; B01L 3/502761

See application file for complete search history.

(56) References Cited

U.S. PATENT DOCUMENTS

| | | | | |
|---|---|---|---|---|
| 2010/0303686 | A1* | 12/2010 | Horiuchi | B01L 3/50273 137/833 |
| 2014/0030167 | A1* | 1/2014 | Yamashita | G01N 35/1016 422/509 |
| 2020/0330989 | A1* | 10/2020 | Masuhara | B01L 3/50273 |
| 2021/0024381 | A1* | 1/2021 | Hulme | G01N 1/4005 |
| 2023/0152191 | A1 | 5/2023 | Sasahara et al. | |

* cited by examiner

C–C

D–D

F–F

METHOD FOR PREPARING FLOW PATH DEVICE

CROSS-REFERENCE TO RELATED APPLICATION

The present application is a National Phase of International Application No. PCT/JP2023/003587 filed Feb. 3, 2023, which claims priority to Japanese Patent Application No. 2022-18041 filed on Feb. 8, 2022, the entire disclosure of which is incorporated herein by reference.

FIELD

The present disclosure relates to a method for preparing a flow path device.

BACKGROUND

A known flow path device includes a portion (also referred to as a flow path portion) including multiple branched microflow paths for separating, from a liquid containing particles of multiple types, particles of a specific type and particles of other types (refer to, for example, WO 2021/193265).

The flow path portion includes, for example, a main flow path and multiple branch flow paths each being narrower than the main flow path and connected to the main flow path. For example, when particles of a specific type have a larger diameter than particles of other types and when the branch flow paths have a width larger than the diameters of the particles of the other types and smaller than the diameter of the particles of the specific type, the particles of the other types are introduced from the main flow path into the branch flow paths and separated from the particles of the specific type flowing in the main flow path.

SUMMARY

One or more aspects of the present disclosure are directed to a method for preparing a flow path device.

In an aspect, a method for preparing a flow path device includes a first process and a second process. The flow path device includes a flow path portion not open in an outer surface of the flow path device and a plurality of holes each being continuous with the flow path portion and being open in the outer surface. The flow path portion includes a first flow path and a plurality of second flow paths each connected to the first flow path and being narrower than the first flow path. The plurality of holes includes a first inlet hole continuous with a first upstream portion in the first flow path, a first outlet hole continuous with a first downstream portion in the first flow path, and a second outlet hole continuous with a second downstream portion in each of the plurality of second flow paths. The second downstream portion is opposite to the first flow path. The first process includes connecting a liquid feeder to the first inlet hole. The liquid feeder feeds a liquid toward the first flow path through the first inlet hole. The first process includes connecting a liquid suction unit to the second outlet hole. The liquid suction unit sucks the liquid from the first flow path through the plurality of second flow paths and the second outlet hole. The second process includes sucking, with the liquid suction unit, the liquid from the first flow path through the plurality of second flow paths and the second outlet hole at a first suction rate being lower than or equal to a first feed rate while feeding, with the liquid feeder, the liquid toward the first flow path through the first inlet hole at the first feed rate, and filling a first area and a second area with the liquid. The first area extends from the first inlet hole through the first flow path to the first outlet hole. The second area extends from the first flow path through each of the plurality of second flow paths to the second outlet hole.

DETAILED DESCRIPTION

Figure 1:
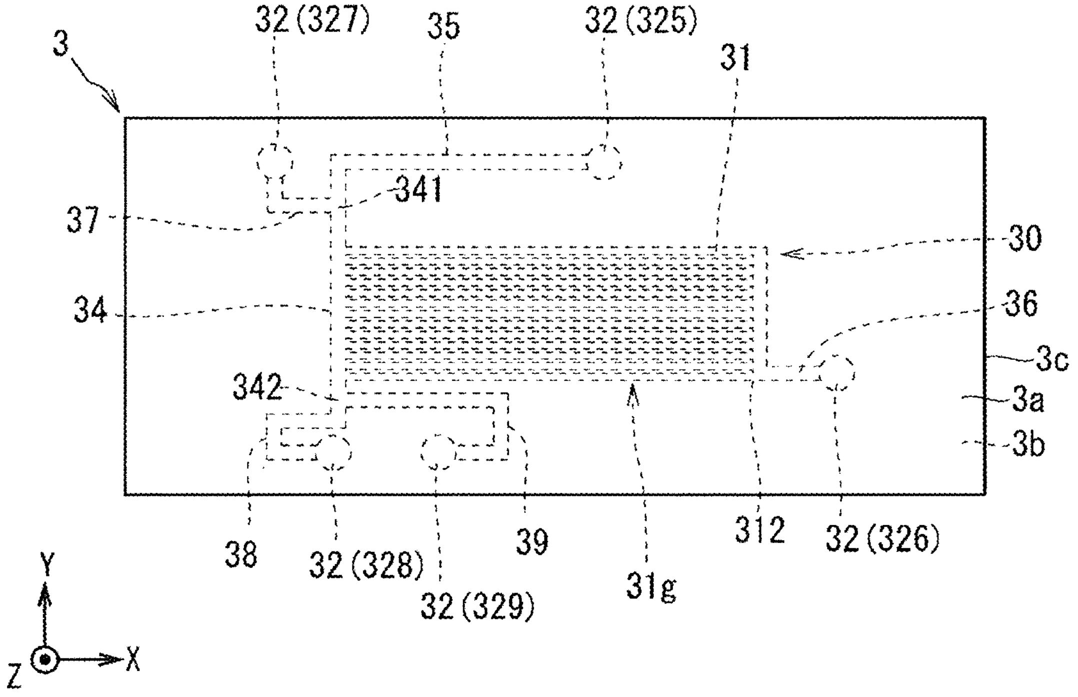
FIG. 1 is a schematic plan view of an example first flow path device according to a first embodiment.

A known flow path device includes a portion (also referred to as a flow path portion) including branched microflow paths for separating, from a liquid (also referred to as a processing target liquid) containing particles of multiple types, particles of a specific type (also referred to as first particles) and particles of other types (also referred to as second particles).

The flow path portion includes, for example, a main flow path and multiple branch flow paths each being narrower than the main flow path and connected to the main flow path. For example, when the first particles have a larger diameter than the second particles and when the branch flow paths have a width larger than the diameters of the second particles and smaller than the diameter of the first particles, the second particles are introduced from the main flow path into the branch flow paths and separated from the first particles flowing in the main flow path.

When, for example, the main flow path has a larger width than the branch flow paths, the resistance to the liquid flowing from upstream to downstream in the main flow path is smaller than the resistance to the liquid flowing from upstream to downstream in the branch flow paths. Thus, for example, when the processing target liquid is fed upstream from a portion (also referred to as a branch portion) in the main flow path connected to the multiple branch flow paths, the liquid does not easily flow in at least a part of the branch flow paths due to air being inside, whereas the liquid easily flows downstream in the main flow path. This causes, for example, in branch flow paths that allow less liquid to flow, fewer second particles to be introduced from the main flow path to the branch flow paths, causing insufficient separating of the first particles from the second particles.

In the flow path device, processing (also referred to as pretreatment) may be performed to fill the branch flow paths and the main flow path with a predetermined liquid (also referred to as a pretreatment liquid) before the processing target liquid is fed to an upstream portion in the main flow path.

However, when the pretreatment liquid is fed to the main flow path, for example, the resistance to the pretreatment liquid flowing from upstream to downstream in the main flow path is also smaller than the resistance to the pretreatment liquid flowing from upstream to downstream in the branch flow paths. Thus, when the pretreatment liquid is fed upstream from the branch portion in the main flow path, for example, the pretreatment liquid does not easily flow in the branch flow paths due to air being inside, whereas the pretreatment liquid easily flows downstream in the main flow path. Thus, the pretreatment liquid fed to the main flow path does not easily fill the branch flow paths.

When, for example, the flow path device is made of a specific material such as polydimethylsiloxane (PDMS), the pretreatment liquid may be fed to the upstream portion in the main flow path within a predetermined allowable period after the flow path device being vacuum-packed is removed from its package. This allows the branch flow paths to be easily filled with the pretreatment liquid. However, the predetermined allowable period in this example is set to, for example, about 10 to 30 minutes, involving complicated work such as strict time management after the vacuumed package is opened.

The whole flow path device may be, for example, placed in a vacuum chamber immediately before being used. A vacuum pump may then be used to decompress the vacuum chamber to evacuate the flow path portion. The flow path device may also be evacuated immediately before being used with, for example, a vacuum pump connected to some of openings in the flow path device continuous with the flow path portion while all the other openings are closed. However, a complex device is used for evacuating the flow path portion immediately before the flow path device is used. In particular, when the flow path device includes many openings continuous with the flow path portion, a device used for evacuating can be large, complicated, and take complicated control.

Thus, the flow path device is to be improved to allow relatively narrow flow paths in the flow path portion to be filled with a liquid as preparation before its intended use.

The inventor of the present disclosure has devised a technique for easily filling the relatively narrow flow paths in the flow path portion with a liquid as preparation for using the flow path device.

Embodiments of the present disclosure will now be described with reference to the drawings. In the drawings, the same reference numerals denote the components with the same or similar structures and functions. The components with the same or similar structures and functions will not be described repeatedly. The drawings are schematic.

The drawings may include the right-handed XYZ coordinate system for convenience. A positive Z-direction is hereafter defined as the vertically upward direction (or simply the upward direction). The vertically downward direction is also referred to as a negative Z-direction. The direction opposite to an X-direction is also referred to as a negative X-direction. The direction opposite to a Y-direction is also referred to as a negative Y-direction.

In each of the cross-sectional views in FIGS. 14 to 19, the flow path device is partially cut and not illustrated.

"The flow path" described hereafter has the structure that allows a liquid to flow. The dimension of the flow path in the direction orthogonal to the direction in which the flow path extends is referred to as the width of the flow path. Having a relatively small width indicates that the flow path is relatively narrow. Having a relatively large width indicates that the flow path is relatively wide.

1. First Embodiment

1-1. Example Schematic Structure of First Flow Path Device

Figure 2:
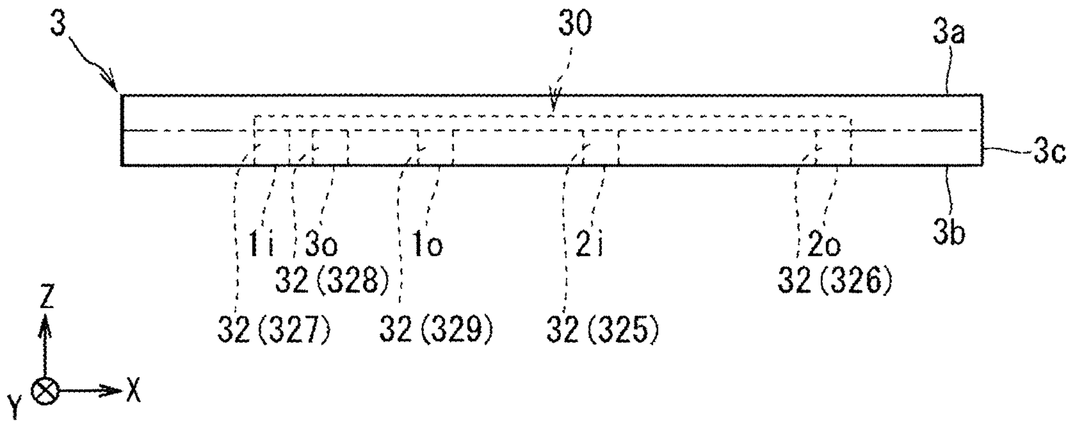
FIG. 2 is a schematic front view of the example first flow path device according to the first embodiment.

FIG. 1 is a schematic plan view of an example flow path device 3 (also referred to as a first flow path device) as a separating device according to a first embodiment. FIG. 2 is a schematic front view of the example first flow path device 3 according to the first embodiment.

In the first embodiment, the first flow path device 3 is, for example, a plate. The first flow path device 3 includes, for example, a surface (also referred to as a first upper surface) 3*a*, a surface (also referred to as a first lower surface) 3*b* opposite to the first upper surface 3*a*, and surfaces (also referred to as first side surfaces) 3*c* connecting the first upper surface 3*a* and the first lower surface 3*b*. In other words, the first flow path device 3 includes an outer surface including the first upper surface 3*a*, the first lower surface 3*b*, and the first side surfaces 3$c$. The first upper surface 3$a$ is located in the positive Z-direction from the first lower surface 3$b$.

In the examples in FIGS. 1 and 2, the first upper surface 3$a$ faces in the positive Z-direction. In other words, the first upper surface 3$a$ has a normal in the positive Z-direction. The first lower surface 3$b$ faces in the negative Z-direction. In other words, the first lower surface 3$b$ has a normal in the negative Z-direction. The first upper surface 3$a$ and the first lower surface 3$b$ are each, for example, flat and rectangular.

The first flow path device 3 has a thickness of, for example, about 1 to 5 millimeters (mm). The thickness of the first flow path device 3 refers to the dimension of the first flow path device 3 in the positive Z-direction. The first upper surface 3$a$ and the first lower surface 3$b$ of the first flow path device 3 each have a width of, for example, about 10 to 50 mm. The width of the first upper surface 3$a$ refers to the dimension of the first upper surface 3$a$ in a positive X-direction. The width of the first lower surface 3$b$ refers to the dimension of the first lower surface 3$b$ in the positive X-direction. The first upper surface 3$a$ and the first lower surface 3$b$ of the first flow path device 3 each have a length of, for example, about 10 to 30 mm. The length of the first upper surface 3$a$ refers to the dimension of the first upper surface 3$a$ in a positive Y-direction. The length of the first lower surface 3$b$ refers to the dimension of the first lower surface 3$b$ in the positive Y-direction.

The first flow path device 3 includes a flow path portion 30 that is not open in the outer surface of the first flow path device 3, and multiple holes 32 that are each continuous with the flow path portion 30 and are open in the outer surface of the first flow path device 3. "A first portion being continuous with a second portion" refers to the first portion being directly continuous with the second portion to allow a fluid such as a liquid to flow between the first portion and the second portion or refers to the first portion being continuous with the second portion through another portion (also referred to as a third portion) to allow a fluid to flow between the first portion and the second portion. The first portion, the second portion, and the third portion herein are each a portion in which a fluid can flow, such as a flow path or a hole. The third portion may be a combination of two or more flow paths, a combination of one or more flow paths and one or more holes, or a combination of two or more holes. The flow path portion 30 is inside the first flow path device 3. In other words, for example, the flow path portion 30 is not open in either the first upper surface 3$a$ or the first lower surface 3$b$. FIG. 2 illustrates the flow path portion 30 in a simplified manner.

Figure 3:
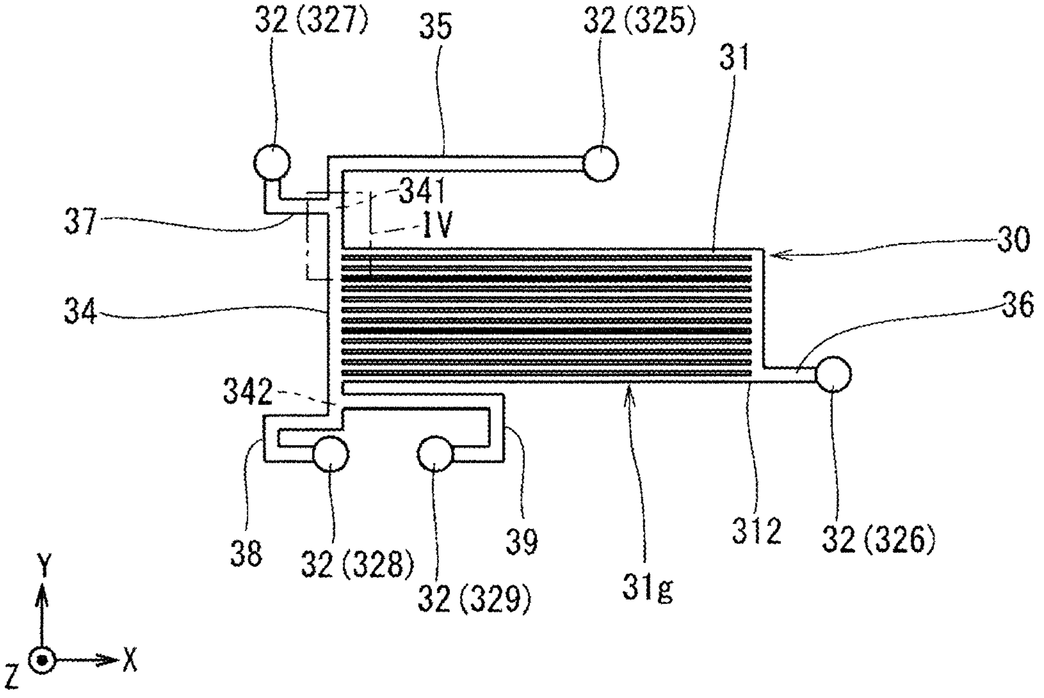
FIG. 3 is a schematic plan view of a flow path portion and multiple holes in the first flow path device illustrating their example structures.
Figure 4:
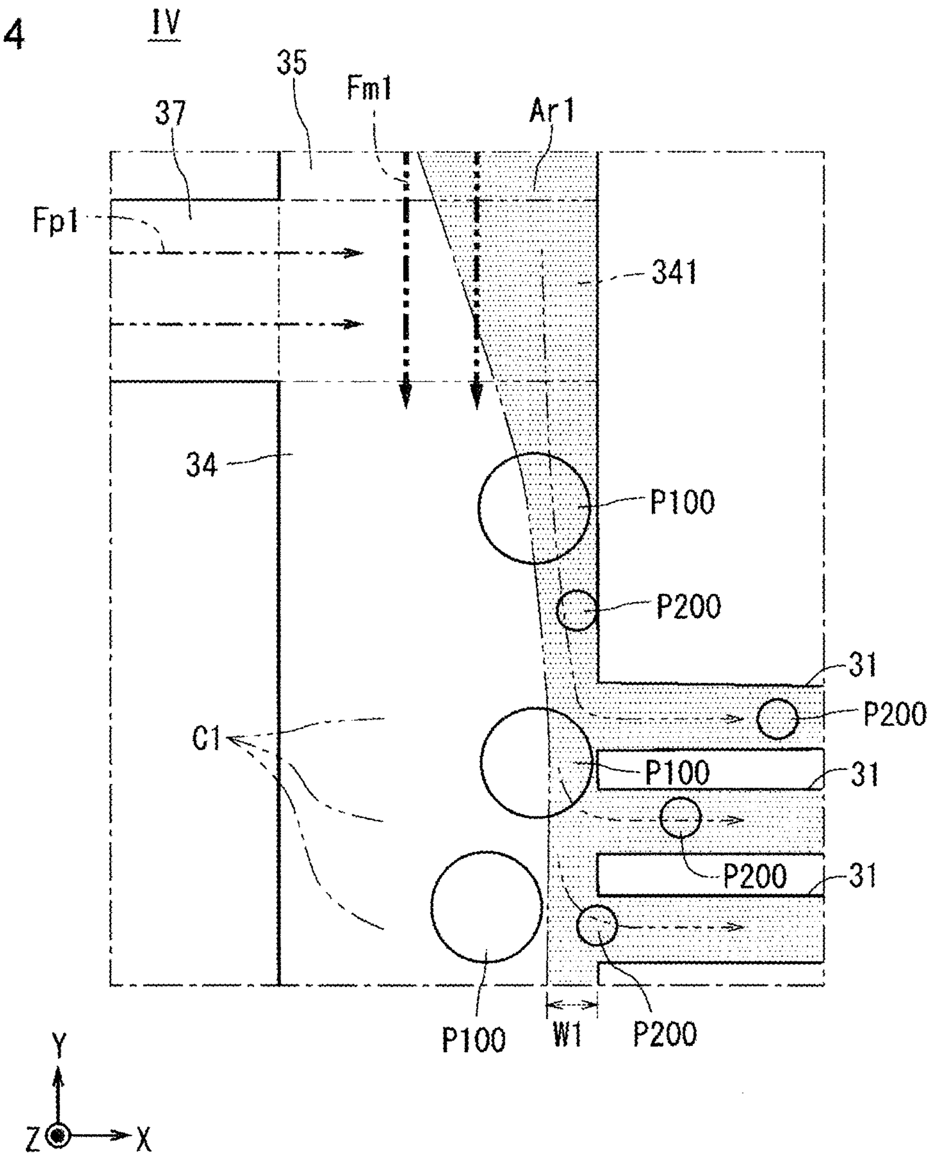
FIG. 4 is a plan view of a rectangular area IV defined by a dot-dash line in FIG. 3.

FIG. 3 is a schematic plan view of the flow path portion 30 and the multiple holes 32 in the first flow path device 3 illustrating their example structures. In FIG. 3, an outer edge of the first flow path device 3 is not illustrated, and outer edges of the flow path portion 30, two inlet holes 325 and 327, and three outlet holes 326, 328, and 329 are drawn with solid lines. FIG. 4 illustrates a part of the flow path portion 30. In FIG. 4, outer edges of a main flow path 34, multiple branch flow paths 31, and two flow paths 35 and 37 are drawn with solid lines.

The flow path portion 30 includes multiple flow paths that are grooves connected to one another and are not open in the outer surface of the first flow path device 3. The flow path portion 30 includes, for example, the flow path (also referred to as the main flow path) 34 as a first flow path and the multiple flow paths (also referred to as branch flow paths) 31 as second flow paths.

The main flow path 34 is, for example, a straight flow path extending in the negative Y-direction as the first direction. The main flow path 34 includes an upstream portion (also referred to as a first upstream portion) 341 and a downstream portion (also referred to as a first downstream portion) 342. The main flow path 34 extends in the negative Y-direction as the first direction from the first upstream portion 341 to the first downstream portion 342.

Each of the multiple branch flow paths 31 is, for example, connected to the main flow path 34 and is narrower than the main flow path 34. For example, the branch flow paths 31 are each open in a side surface of the main flow path 34 located in the positive X-direction as the second direction orthogonal to the negative Y-direction as the first direction between the first upstream portion 341 and the first downstream portion 342. In other words, the main flow path 34 includes multiple portions (also referred to as connections) C1 connected to the respective branch flow paths 31. For example, the branch flow paths 31 branch from the main flow path 34 at respective different positions in the negative Y-direction as the first direction. In other words, the multiple connections C1 connected to the respective branch flow paths 31 are at respective different positions in the negative Y-direction as the first direction.

In the examples in FIGS. 1 and 3, the multiple branch flow paths 31 each extend in the positive X-direction as the second direction. In other words, the branch flow paths 31 are arranged in the negative Y-direction as the first direction. The branch flow paths 31 are included in, for example, a group of branch flow paths 31$g$ (also referred to as a branch flow path group). The branch flow paths 31 may be, for example, several tens to several hundreds branch flow paths 31. FIGS. 1 and 3 illustrate thirteen branch flow paths 31 for convenience.

The multiple holes 32 include, for example, the inlet hole 327 as a first inlet hole, the inlet hole 325 as a second inlet hole, the outlet hole 329 as a first outlet hole, the outlet hole 326 as a second outlet hole, and the outlet hole 328 as a third outlet hole.

The inlet hole 327 is, for example, continuous with the first upstream portion 341 of the main flow path 34. For example, the inlet hole 327 is connected to the first upstream portion 341 through the flow path 37. In other words, the flow path portion 30 includes the flow path 37 as a third flow path connecting the inlet hole 327 as the first inlet hole and the first upstream portion 341. For example, the flow path 37 is wider than each of the branch flow paths 31. For example, the inlet hole 327 has a diameter that is the same as or larger than the width of the flow path 37. In the first embodiment, the flow path 37 includes a portion connected to the first upstream portion 341 and being open in a side surface of the main flow path 34 located opposite to the positive X-direction as the second direction. In the examples in FIGS. 1 and 3, the flow path 37 is an L-shaped flow path including a portion extending from the inlet hole 327 in the negative Y-direction as the first direction and a portion extending in the positive X-direction opposite to the second direction and connected to the first upstream portion 341. These portions are connected in the stated order. In other words, the flow path 37 extends in the negative Y-direction and then in the positive X-direction.

The inlet hole 325 is, for example, continuous with the first upstream portion 341 in the main flow path 34. For example, the inlet hole 325 is connected to the first upstream portion 341 through the flow path 35. In other words, the flow path portion 30 includes the flow path 35 as a fourth flow path connecting the inlet hole 325 as the second inlet hole and the first upstream portion 341. For example, the flow path 35 is wider than each of the branch flow paths 31.

For example, the inlet hole 325 has a diameter that is the same as or larger than the width of the flow path 35. In the first embodiment, the flow path 35 includes a portion connected to the first upstream portion 341 and extending in the negative Y-direction as the first direction. In the examples in FIGS. 1 and 3, the flow path 35 extends in the negative Y-direction as the first direction to be connected to the first upstream portion 341 in the main flow path 34. More specifically, the flow path 35 is an L-shaped flow path including a portion extending from the inlet hole 325 in the negative X-direction opposite to the second direction and a portion extending in the negative Y-direction as the first direction. These portions are connected in the stated order. In other words, the flow path 35 extends in the negative X-direction and then in the negative Y-direction.

The outlet hole 329 is, for example, continuous with the first downstream portion 342 in the main flow path 34. For example, the outlet hole 329 is connected to the first downstream portion 342 through a flow path 39. In other words, the flow path portion 30 includes the flow path 39 as a fifth flow path connecting the outlet hole 329 as the first outlet hole and the first downstream portion 342. For example, the flow path 39 is wider than each of the branch flow paths 31. For example, the outlet hole 329 has a diameter that is the same as or larger than the width of the flow path 39. In the first embodiment, the flow path 39 includes a portion connected to the first downstream portion 342 and being open in a side surface of the first downstream portion 342 located in the positive X-direction as the second direction. In the examples in FIGS. 1 and 3, the flow path 39 is a U-shaped flow path including a portion connected to the first downstream portion 342 and extending in the positive X-direction as the second direction, a portion extending in the negative Y-direction as the first direction, and a portion extending in the negative X-direction opposite to the second direction. These portions are connected in the stated order. In other words, the flow path 39 extends in the positive X-direction, in the negative Y-direction, and then in the negative X-direction.

The outlet hole 326 is continuous with, for example, a portion (also referred to as a second downstream portion) 312 in each of the multiple branch flow paths 31 opposite to the main flow path 34. For example, the outlet hole 326 is connected to the second downstream portion 312 in each of the branch flow paths 31 through a flow path 36. In other words, the flow path portion 30 includes the flow path 36 as a sixth flow path connecting the outlet hole 326 as the second outlet hole and the second downstream portion 312 in each of the branch flow paths 31. More specifically, for example, the branch flow paths 31 are connected to the flow path 36 at respective different positions in the negative Y-direction as the first direction. For example, the flow path 36 is wider than each of the branch flow paths 31. For example, the outlet hole 326 has a diameter that is the same as or larger than the width of the flow path 36. In the examples in FIGS. 1 and 3, the flow path 36 is an L-shaped fluid channel including a portion connected to the multiple second downstream portion 312 in the respective branch flow paths 31 and extending straight in the negative Y-direction as the first direction and a portion extending straight in the positive X-direction as the second direction. These portions are connected in the stated order. In other words, the flow path 36 extends in the negative Y-direction and then in the positive X-direction.

The outlet hole 328 is, for example, continuous with the first downstream portion 342 in the main flow path 34. For example, the outlet hole 328 is connected to the first downstream portion 342 through a flow path 38. In other words, the flow path portion 30 includes the flow path 38 as a seventh flow path connecting the outlet hole 328 as the third outlet hole and the first downstream portion 342. For example, the flow path 38 is wider than each of the branch flow paths 31. For example, the outlet hole 328 has a diameter that is the same as or larger than the width of the flow path 38. In the first embodiment, the flow path 38 includes a portion connected to the first downstream portion 342 and extending in the negative Y-direction. In the examples in FIGS. 1 and 3, the flow path 38 includes a portion connected to the first downstream portion 342 and extending in the negative Y-direction as the first direction, a portion extending in the negative X-direction opposite to the second direction, a portion extending in the negative Y-direction as the first direction, and a portion extending in the positive X-direction as the second direction and connected to the outlet hole 328. These portions are connected in the stated order. In other words, the flow path 38 extends in the negative Y-direction, in the negative X-direction, in the negative Y-direction, and then in the positive X-direction.

In the first embodiment, for example, the two inlet holes 325 and 327 and the three outlet holes 326, 328, and 329 are each not open in the first upper surface 3*a* and are open in the first lower surface 3*b*. For example, the inlet hole 327 includes a portion (also referred to as a first inlet or a first entrance) li that is open in the first lower surface 3*b*. The inlet hole 325 includes a portion (also referred to as a second inlet or a first entrance) 2*i* that is open in the first lower surface 3*b*. The outlet hole 329 includes a portion (also referred to as a first outlet or a first exit) 1*o* that is open in the first lower surface 3*b*. The outlet hole 326 includes a portion (also referred to as a second outlet or a second exit) 2O that is open in the first lower surface 3*b*. The outlet hole 328 includes a portion (also referred to as a third outlet or a third exit) 3O that is open in the first lower surface 3*b*.

1-2. Overall Example Functions of First Flow Path Device

The functions of the first flow path device 3 are roughly described below.

The liquid (also referred to as the processing target liquid) containing particles P100 and P200 (refer to FIG. 4) of multiple types is introduced into the first flow path device 3. For example, the first flow path device 3 separates the separating target particles P100 as the particles of the specific type from the particles P200 of the other type (also referred to as non-target particles) and discharges the separating target particles P100. The liquid may contain particles of three or more types. In the example described below, the separating target particles P100 are of a single type, and the non-target particles P200 are of another single type.

A pressing liquid is introduced into the first flow path device 3 through the inlet hole 327. The processing target liquid is introduced into the first flow path device 3 through the inlet hole 325. Specific examples and the functions of the pressing liquid will be described later.

For example, a tube may be externally connected to the first flow path device 3 to introduce the pressing liquid into the first flow path device 3 through the inlet hole 327. To connect the tube, for example, the first lower surface 3*b* of the first flow path device 3 may include a cylindrical portion protruding in the positive Z-direction and surrounding the inlet hole 327 about a Z-axis as viewed in plan (hereafter, as viewed in plan in the negative Z-direction unless otherwise specified).

For example, a tube may be externally connected to the first flow path device 3 to introduce the processing target liquid into the first flow path device 3 through the inlet hole 325. To connect the tube, for example, the first lower surface 3*b* of the first flow path device 3 may include a cylindrical portion protruding in the positive Z-direction and surrounding the inlet hole 325 about the Z-axis as viewed in plan.

For example, the processing target liquid introduced into the first flow path device 3 through the inlet hole 325 flows through the flow path 35 into the first upstream portion 341 in the main flow path 34.

For example, the pressing liquid introduced into the first flow path device 3 through the inlet hole 327 flows through the flow path 37 into the first upstream portion 341 in the main flow path 34.

In FIG. 4, arrows Fp1 drawn with two-dot-dash lines indicate a direction in which the pressing liquid flows. The direction is the positive X-direction. In FIG. 4, arrows Fm1 drawn with two-dot-dash lines thicker than the arrows Fp1 indicate a direction in which the processing target liquid mainly flows (also referred to as a main flow) from the flow path 35 into the main flow path 34. The direction of the main flow is the negative Y-direction as the first direction. In FIG. 4, a rectangle drawn with a thin two-dot-dash line imaginarily indicates an outer edge of the first upstream portion 341.

FIG. 4 schematically illustrates the separating target particles P100 with a larger diameter than the non-target particles P200 being separated from the non-target particles P200. More specifically, for example, each of the branch flow paths 31 has a width larger than the diameter of the non-target particles P200 and smaller than the diameter of the separating target particles P100. The width of each of the branch flow paths 31 herein refers to the dimension of the branch flow path 31 in the Y-direction.

At least the main flow path 34 and the flow path 35 each have a width larger than the diameter of the separating target particles P100 and the diameter of the non-target particles P200. The width of the main flow path 34 herein refers to the dimension of the main flow path 34 in the X-direction orthogonal to the negative Y-direction as the first direction. The width of the flow path 35 refers to the dimension of the flow path 35 in the X-direction for its portion near the main flow path 34. The width of the flow path 35 refers to the dimension of the flow path 35 in the Y-direction for its portion extending in the negative X-direction.

The non-target particles P200 move in the negative Y-direction as the first direction in the main flow path 34 and receive a directing force in the positive X-direction. Most of the non-target particles P200 are thus each introduced into any of the branch flow paths 31. Most of the non-target particles P200 each sequentially flow through any of the branch flow paths 31 and the flow path 36 and are discharged out of the first flow path device 3 through the outlet hole 326. In this example, the branch flow paths 31 connected to the main flow path 34 each have a cross-sectional area and a length adjusted to cause each of the non-target particles P200 to flow from the main flow path 34 into any of the branch flow paths 31 and to be separated from the separating target particles P100. The non-target particles P200 discharged out of the first flow path device 3 through the outlet hole 326 may undergo, for example, specific processing in another device directly connected to the outlet hole 326 or connected using another member such as a tube, or may be simply collected. The non-target particles P200 discharged out of the first flow path device 3 through the outlet hole 326 may be, for example, directly discarded or discarded through another member such as a tube.

The separating target particles P100 move in the negative Y-direction as the first direction in the main flow path 34 substantially without being introduced into the multiple branch flow paths 31. Most of the separating target particles P100 sequentially flow through the main flow path 34 and the flow path 39 and are discharged out of the first flow path device 3 through the outlet hole 329. In this example, the flow path 39 has a width larger than the size of the separating target particles P100. The separating target particles P100 reaching the first downstream portion 342 flow into the flow path 39, rather than into the flow path 38, under the same force as for each of the non-target particles P200 flowing into any of the branch flow paths 31 from the main flow path 34. The separating target particles P100 discharged out of the first flow path device 3 through the outlet hole 329 may undergo, for example, specific processing in another device directly connected to the outlet hole 329 or connected using another member such as a tube, or may be simply collected.

A component (also referred to as a remaining component) of the processing target liquid other than the non-target particles P200 each flowing into any of the branch flow paths 31 and the separating target particles P100 flowing into the flow path 39 flows into the flow path 38. The remaining component flows through the flow path 38 and is discharged through the outlet hole 328. The remaining component discharged out of the first flow path device 3 through the outlet hole 328 may undergo, for example, specific processing in another device directly connected to the outlet hole 328 or connected using another member such as a tube, or may be simply collected. The remaining component discharged out of the first flow path device 3 through the outlet hole 328 may be, for example, directly discarded or discarded through another member such as a tube.

In the first embodiment, the processing target liquid is directed to the branch flow paths 31 using a flow (also referred to as a fluid-drawing flow). The fluid-drawing flow may facilitate separating of the separating target particles P100 from the non-target particles P200 using the main flow path 34 and the multiple branch flow paths 31. The fluid-drawing flow is indicated by a hatched area Ar1 with a dot pattern in FIG. 4. The state of the fluid-drawing flow indicated by the area Ar1 in FIG. 4 is a mere example and may be changed based on the relationship between the flow velocity as well as the flow rate of the processing target liquid introduced into the main flow path 34 through the flow path 35 and the flow velocity as well as the flow rate of the pressing liquid introduced into the first upstream portion 341 in the main flow path 34 through the flow path 37. The area Ar1 may be adjusted as appropriate to efficiently separate the separating target particles P100 and the non-target particles P200 from the processing target liquid. The pressing liquid directs the processing target liquid toward the multiple branch flow paths 31 in the positive X-direction from a position opposite to the multiple branch flow paths 31. The pressing liquid may facilitate creation of the fluid-drawing flow.

As described above, the main flow path 34 extends in the negative Y-direction as the first direction in this example. The flow path 35 includes a portion connected to the first upstream portion 341 and extending in the negative Y-direction as the first direction. The multiple branch flow paths 31 are each open in the side surface of the main flow path 34 located in the positive X-direction as the second direction between the first upstream portion 341 and the first downstream portion 342. The flow path 37 is open in a side surface of the first upstream portion 341 of the main flow path 34 located in the negative X-direction opposite to the second direction. Thus, for example, with the pressing liquid being fed into the main flow path 34 through the inlet hole 327, the processing target liquid containing multiple types of particles is fed into the main flow path 34 through the inlet hole 325 to generate a liquid flow that directs the particles of multiple types toward the branch flow paths 31 in the main flow path 34. This allows, for example, among the particles of multiple types, the non-target particles P200 with a smaller diameter than the width of each of the branch flow paths 31 to flow more easily into the branch flow paths 31. Thus, for example, among the particles of multiple types in the processing target liquid, the separating target particles P100 with a larger diameter than the width of each of the branch flow paths 31 may be easily separated from the non-target particles P200 with a smaller diameter than the width of each of the branch flow paths 31.

In the first embodiment, as described above, the flow path 39 includes a portion connected to the first downstream portion 342 in the main flow path 34 and being open in the side surface of the first downstream portion 342 in the positive X-direction as the second direction. Thus, the fluid-drawing flow in the main flow path 34 allows, for example, the separating target particles P100 with a larger diameter than the width of each of the branch flow paths 31 to easily flow into the flow path 39. This allows, for example, the separating target particles P100 to flow through the flow path 39 and to be easily discharged out of the first flow path device 3 through the outlet hole 329. Thus, for example, among the particles of multiple types in the processing target liquid, the separating target particles P100 with a larger diameter than the width of each of the branch flow paths 31 may be easily separated from the non-target particles P200 with a smaller diameter than the width of each of the branch flow paths 31.

In FIG. 4, the fluid-drawing flow in the main flow path 34 has a width W1 in an area near the main flow path 34 branched to the multiple branch flow paths 31. In this example, the width of the fluid-drawing flow in the main flow path 34 refers to the dimension of the fluid-drawing flow in the X-direction. The width W1 may be set by, for example, adjusting the cross-sectional areas and the lengths of the main flow path 34 and the branch flow paths 31 as well as by the flow rates of the processing target liquid and the pressing liquid.

At the width W1 illustrated in FIG. 4, the area Ar1 of the fluid-drawing flow does not include the center of gravity of each of the separating target particles P100 and includes the center of gravity of each of the non-target particles P200.

The processing target liquid is, for example, blood as a liquid containing particles of multiple types. In this case, for example, the separating target particles P100 are white blood cells, and the non-target particles P200 are red blood cells. The specific processing on the separating target particles P100 is, for example, to count white blood cells. The remaining component flowing into the flow path 38 and discharged out of the first flow path device 3 through the outlet hole 328 is, for example, blood plasma. In this case, the pressing liquid is, for example, phosphate buffered saline (PBS). The pressing liquid may be a liquid of PBS containing other elements to allow the pressing liquid to function appropriately for the purpose of using the first flow path device 3. The other elements may be, for example, ethylenediaminetetraacetic acid (EDTA) as a second element and bovine serum albumin (BSA) as a third element.

A red blood cell has the center of gravity at, for example, about 2 to 2.5 micrometers (μm) from its outer rim. A red blood cell has a maximum diameter of, for example, about 6 to 8 μm. A white blood cell has the center of gravity at, for example, about 5 to 10 μm from its outer rim. A white blood cell has a maximum diameter of, for example, about 10 to 30 μm. To effectively separate red blood cells and white blood cells in blood, the fluid-drawing flow has the width W1 of about 2 to 15 μm.

The main flow path 34 has an imaginary cross-sectional area of, for example, about 300 to 1000 square micrometers ($\mu m^2$) along an XZ plane. The main flow path 34 has a length of, for example, about 0.5 to 20 mm in the Y-direction. Each of the branch flow paths 31 has an imaginary cross-sectional area of, for example, about 100 to 500 $\mu m^2$ along a YZ plane. Each of the branch flow paths 31 has a length of, for example, about 3 to 25 mm in the X-direction. The processing target liquid in the main flow path 34 flowing in the negative Y-direction as the first direction has a flow velocity of, for example, about 0.2 to 5 meters per second (m/s). The liquid in the main flow path 34 has a flow rate per unit time of, for example, about 0.1 to 5 microliters per second (μl/s).

In the first flow path device 3, for example, the total volume of the flow path portion 30, the two inlet holes 325 and 327, and the three outlet holes 326, 328, and 329 may be about 0.5 to 2 μl. For example, the total volume of the main flow path 34, the two flow paths 35 and 37, and the two inlet holes 325 and 327 may be about 0.07 to 0.3 μl. For example, the total volume of the main flow path 34, the four flow paths 35, 37, 38, and 39, the two inlet holes 325 and 327, and the two outlet holes 328 and 329 may be about 0.1 to 0.5 μl.

The material for the first flow path device 3 is, for example, a resin such as polydimethylsiloxane (PDMS). PDMS is highly transferable in resin molding using a mold. A material being transferrable refers to a material being capable of forming, on a resin-molded product, fine protrusions and recesses corresponding to a fine pattern on the mold.

The first flow path device 3 may be manufactured by, for example, bonding a first portion that is a plate including fine protrusions and recesses on one surface corresponding to the pattern of the flow path portion 30 and a second portion that is a plate including five through-holes corresponding to the two inlet holes 325 and 327 and the three outlet holes 326, 328, and 329 with one surface of the second portion covering the fine protrusions and recesses on the first portion. The first portion including the fine protrusions and recesses on one surface may be manufactured by, for example, resin molding. The second portion including the five through-holes may be manufactured by, for example, resin molding or by punching five through-holes in a member being a flat plate manufactured by resin molding. The first portion and the second portion may be bonded together without an adhesive and may be bonded by, for example, surface modification of one surface of the first portion and one surface of the second portion or by contact between one surface of the first portion and one surface of the second portion. The surface modification may be performed by, for example, irradiation of oxygen plasma or irradiation of ultraviolet (UV) light using an excimer lamp. For example, with the one surface of the first portion and the one surface of the second portion being made of the same type of resin, the bonding strength between the one surface of the first portion and the one surface of the second portion in surface modification may be increased.

1-3. Example Use of First Flow Path Device

Figure 5:
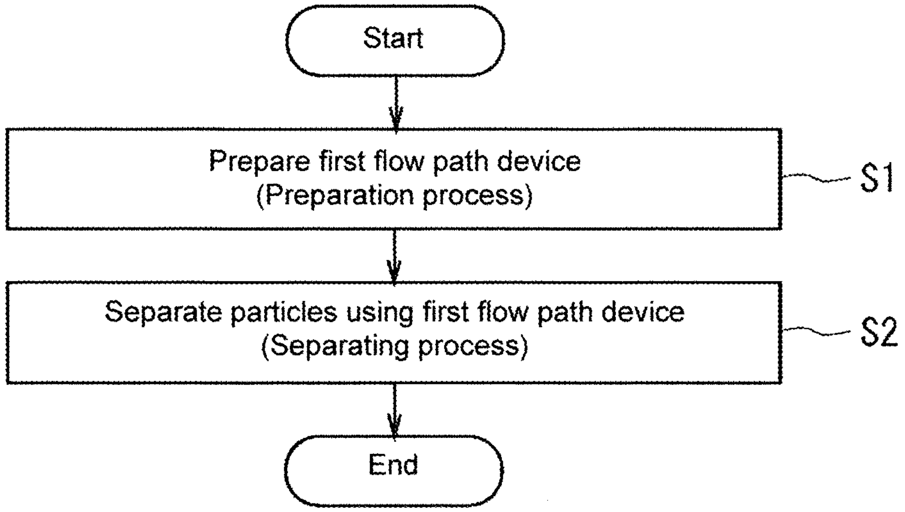
FIG. 5 is a flowchart of example processing of separating particles using the first flow path device.

An example use of the first flow path device 3 will now be described. FIG. 5 is a flowchart of example processing of separating particles using the first flow path device 3.

As illustrated in FIG. 5, a process (also referred to as a preparation process) for preparing the first flow path device 3 in step S1 and a process (also referred to as a separating process) for separating the particles using the first flow path device 3 in step S2 are performed in the stated order in this example. In the preparation process, the first flow path device 3 is prepared before the separating process.

Preparation Process

In the preparation process in step S1, processing (also referred to as introduction processing) of introducing a liquid (also referred to as a pretreatment liquid) into the flow path portion 30 is performed as processing (also referred to as pretreatment) before the processing target liquid is introduced into the first flow path device 3. The introduction processing allows the first flow path device 3 to be cleaned and the processing target liquid to smoothly flow through the flow path portion 30 (in particular, each of the narrow branch flow paths 31) in the separating process. For example, the pretreatment liquid also serves as the pressing liquid.

Figure 6:
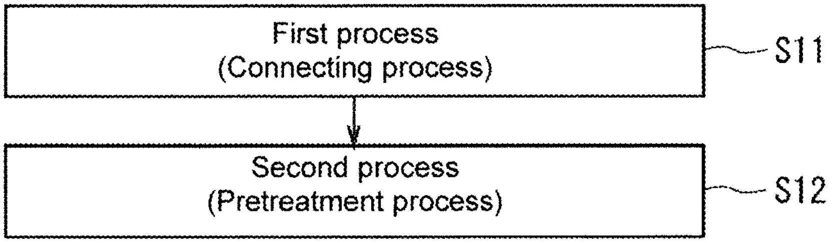
FIG. 6 is a flowchart of example processing in a preparation process.
Figure 7:
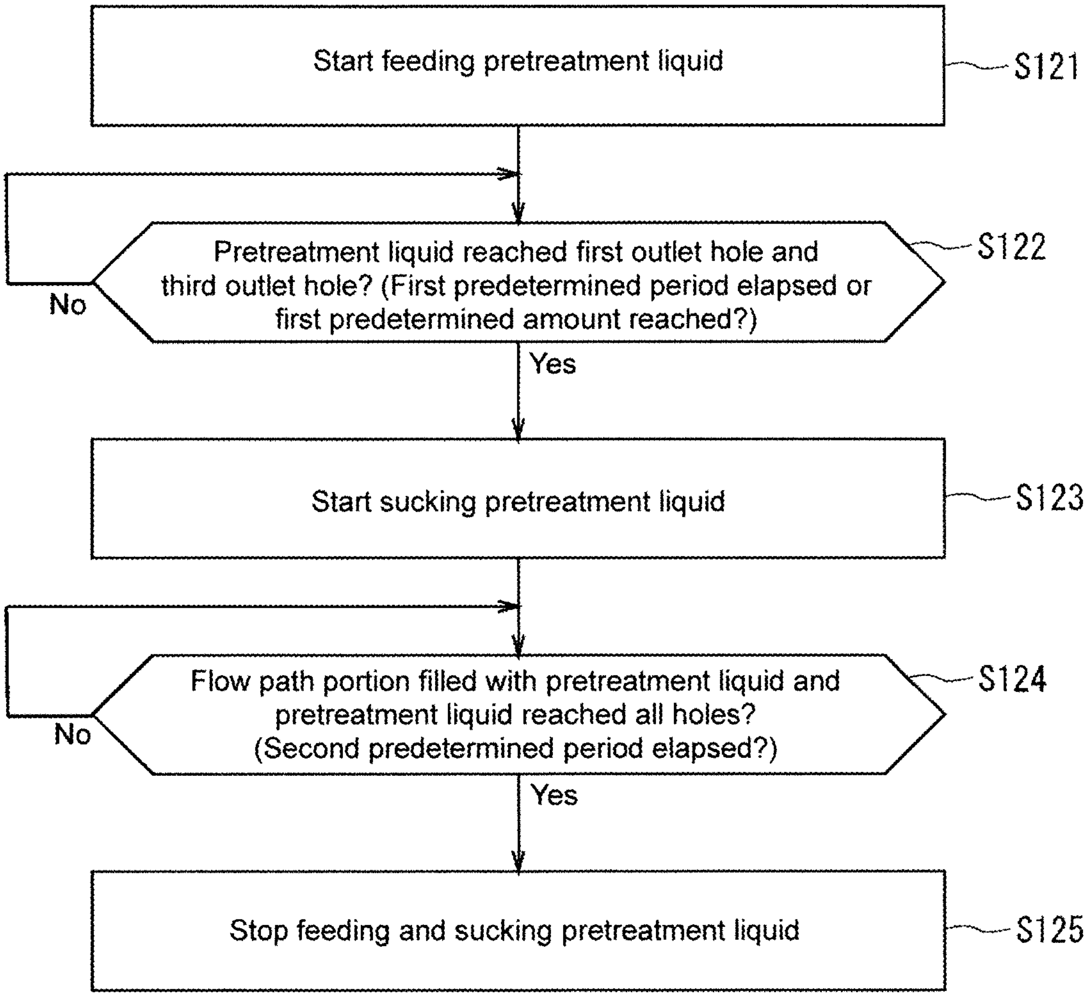
FIG. 7 is a flowchart of example processing in a pretreatment process.
Figure 8:
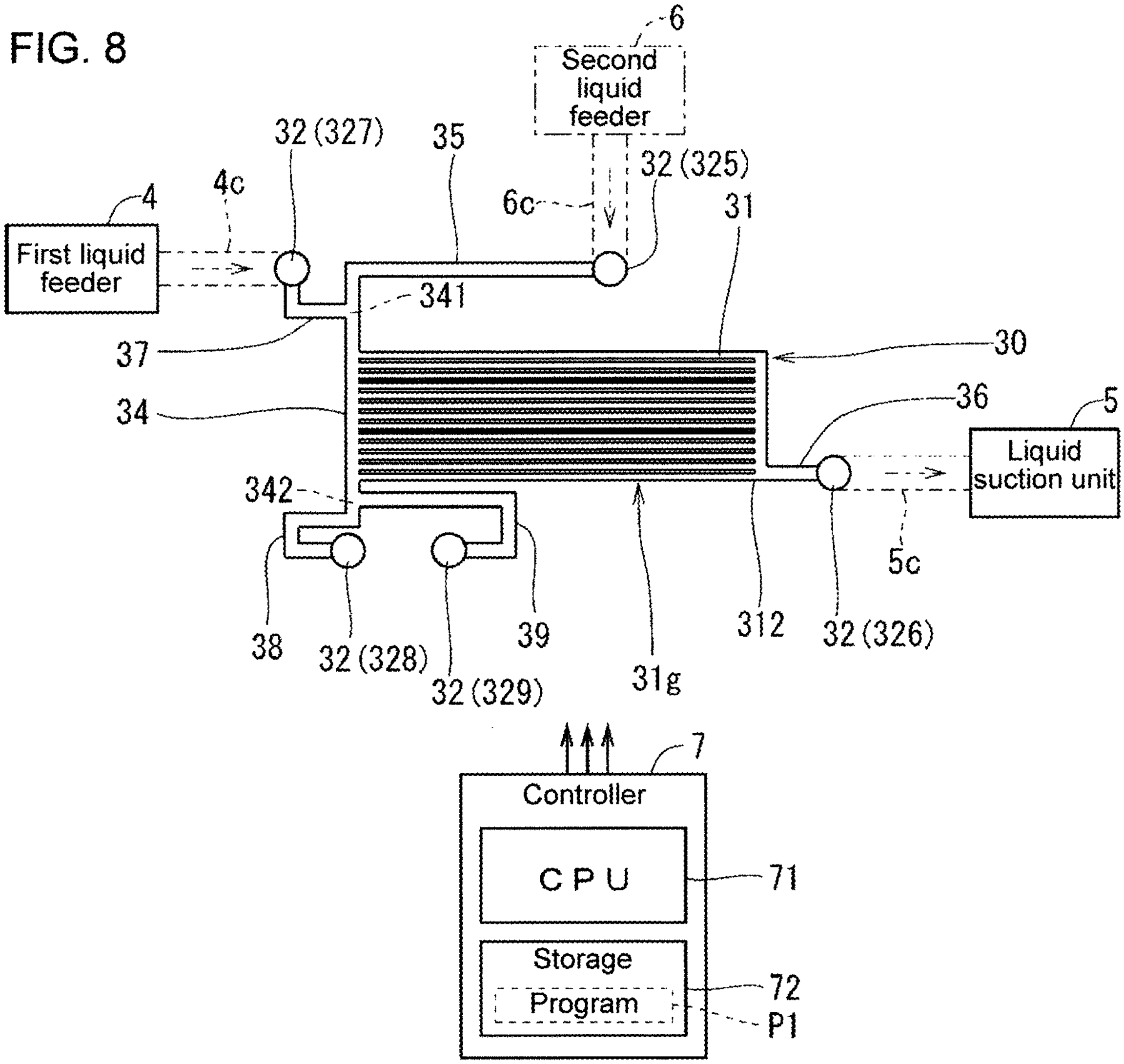
FIG. 8 is a conceptual diagram of components in a connecting process, illustrating an example connection state.

FIG. 6 is a flowchart of example processing in the preparation process performed in step S1 in FIG. 5. As illustrated in FIG. 6, in the preparation process, a connecting process as a first process in step S11 and a pretreatment process as a second process in step S12 are performed in the stated order. In other words, a method for preparing the first flow path device 3 includes the connecting process as the first process and the pretreatment process as the second process. FIG. 7 is a flowchart of example processing in the pretreatment process performed in step S12 in FIG. 6. FIG. 8 is a conceptual diagram of components in the connecting process, illustrating an example connection state.

In the connecting process in step S11, a first liquid feeder 4 that feeds the pretreatment liquid to the main flow path 34 through the inlet hole 327 is connected to the inlet hole 327, and a liquid suction unit 5 that sucks the pretreatment liquid from the main flow path 34 through the multiple branch flow paths 31 and the outlet hole 326 is connected to the outlet hole 326. As illustrated in FIG. 8, for example, the first liquid feeder 4 is connected to the inlet hole 327 through a tube 4*c*. The tube 4*c* includes, for example, a connector at its end for connecting to the inlet hole 327. For example, the liquid suction unit 5 is connected to the outlet hole 326 through a tube 5*c*. The tube 5*c* includes, for example, a connector at its end for connecting to the outlet hole 326. For example, the first liquid feeder 4 may be connected to the inlet hole 327 first, or the liquid suction unit 5 may be connected to the outlet hole 326 first, or these connections may occur at the same time. In FIG. 8, the tubes 4*c* and 5*c* are drawn with thin two-dot-dash lines for convenience, and the direction in which the pretreatment liquid flows in each of the tubes 4*c* and 5*c* is indicated by arrows drawn with thin two-dot-dash lines.

For example, a second liquid feeder 6 that feeds the processing target liquid to the main flow path 34 through the inlet hole 325 may be connected to the inlet hole 325. The second liquid feeder 6 is connected to the inlet hole 325 through, for example, a tube 6*c*. The tube 6*c* includes, for example, a connector at its end for connecting to the inlet hole 325. In FIG. 8, the second liquid feeder 6 and the tube 6*c* are drawn with a thin two-dot-dash lines for convenience, and the direction in which the processing target liquid flows in the tube 6*c* is indicated by an arrow drawn with a thin two-dot-dash line. For example, a device for performing specific processing on the separating target particles P100 or for collecting the separating target particles P100 may be connected to the outlet hole 329 directly or using another member such as a tube. For example, a device for performing specific processing on the remaining component discharged through the outlet hole 328 or for collecting the remaining component discharged through the outlet hole 328 may be connected to the outlet hole 328 directly or using another member such as a tube.

The first liquid feeder 4 may feed the pretreatment liquid using a pump, such as a syringe pump or a plunger pump. The operation of the first liquid feeder 4 may be controlled in response to, for example, a signal from a controller 7. In this case, for example, the controller 7 can control the first liquid feeder 4 to start and stop feeding the pretreatment liquid to the main flow path 34, and can control the feed amount per unit time (also referred to as a first feed rate) of the pretreatment liquid fed from the first liquid feeder 4 to the main flow path 34.

The liquid suction unit 5 may suck liquid and air using a pump, such as a diaphragm pump or a syringe pump. The air to be sucked by the pump is contained mainly in the flow path 37, the main flow path 34, the branch flow paths 31, and the flow path 36 before the pretreatment liquid reaches the outlet hole 326. The air is to be sucked before the pretreatment liquid reaches the outlet hole 326 and the pump starts to directly suck the pretreatment liquid. In one or more embodiments of the present disclosure, "sucking liquid" includes sucking air in any of the flow paths before directly sucking the liquid using a pump. The operation of the liquid suction unit 5 may be controlled in response to, for example, a signal from the controller 7. In this case, for example, the controller 7 can control the liquid suction unit 5 to start and stop sucking the pretreatment liquid from the main flow path 34 through the multiple branch flow paths 31, the flow path 36, and the outlet hole 326, and can control the suction amount per unit time (also referred to as a first suction rate) of the pretreatment liquid sucked by the liquid suction unit 5 from the main flow path 34 through the branch flow paths 31, the flow path 36, and the outlet hole 326.

The second liquid feeder 6 may feed the processing target liquid using a pump, such as a syringe pump or a plunger pump. The operation of the second liquid feeder 6 may be controlled in response to, for example, a signal from the controller 7. In this case, for example, the controller 7 can control the second liquid feeder 6 to start and stop feeding the processing target liquid to the main flow path 34, and can control the feed amount per unit time (also referred to as a second feed rate) of the processing target liquid fed from the second liquid feeder 6 to the main flow path 34.

The controller 7 controls, for example, the operations of the components such as the first liquid feeder 4, the liquid suction unit 5, and the second liquid feeder 6. The controller 7 may be, for example, a computer or a control circuit. The controller 7 includes at least one processor that performs control and processing for implementing various functions, as described in more detail below.

In various embodiments, the at least one processor may be a single integrated circuit (IC), or multiple ICs, multiple discrete circuits, or both these circuits connected to one another for mutual communication. The at least one processor may be implemented using various known techniques.

In one embodiment, the processor includes one or more circuits or units that perform one or more data computation procedures or processes by, for example, executing instructions stored in an associated memory. In another embodiment, the processor may be firmware (e.g., a discrete logic component) to perform one or more data computation procedures or processes.

In various embodiments, the processor includes one or more processors, controllers, microprocessors, microcontrollers, application-specific integrated circuits (ASICs), digital signal processors, programmable logic devices, field programmable gate arrays, combinations of any of these devices or configurations, or combinations of other known devices and configurations. The processor may perform the functions described below.

In this example, the controller 7 includes a central processing unit (CPU) 71 and a storage 72. The storage 72 includes, for example, non-transitory recording media readable by the CPU 71, such as a read-only memory (ROM) and a random-access memory (RAM). The storage 72 stores, for example, a program P1 for controlling the first liquid feeder 4, the liquid suction unit 5, and the second liquid feeder 6. Various functions of the controller 7 are implemented by the CPU 71 executing the program P1 in the storage 72.

Note that the configuration of the controller 7 is not limited to the above example. For example, the controller 7 may include multiple CPUs 71. The controller 7 may also include at least one digital signal processor (DSP). The functions of the controller 7 may be implemented entirely or partially by a hardware circuit, without using software to implement the functions. The storage 72 may also include a non-transitory computer-readable recording medium other than a ROM and a RAM. The storage 72 may include, for example, a small hard disk drive, a solid-state drive (SSD), or both these drives.

As illustrated in FIG. 7, the pretreatment process performed in step S12 includes, for example, processing in steps S121 to S125 performed in the stated order. The pretreatment process may be performed by, for example, the first liquid feeder 4 and the liquid suction unit 5 being controlled by the controller 7.

Figure 9:
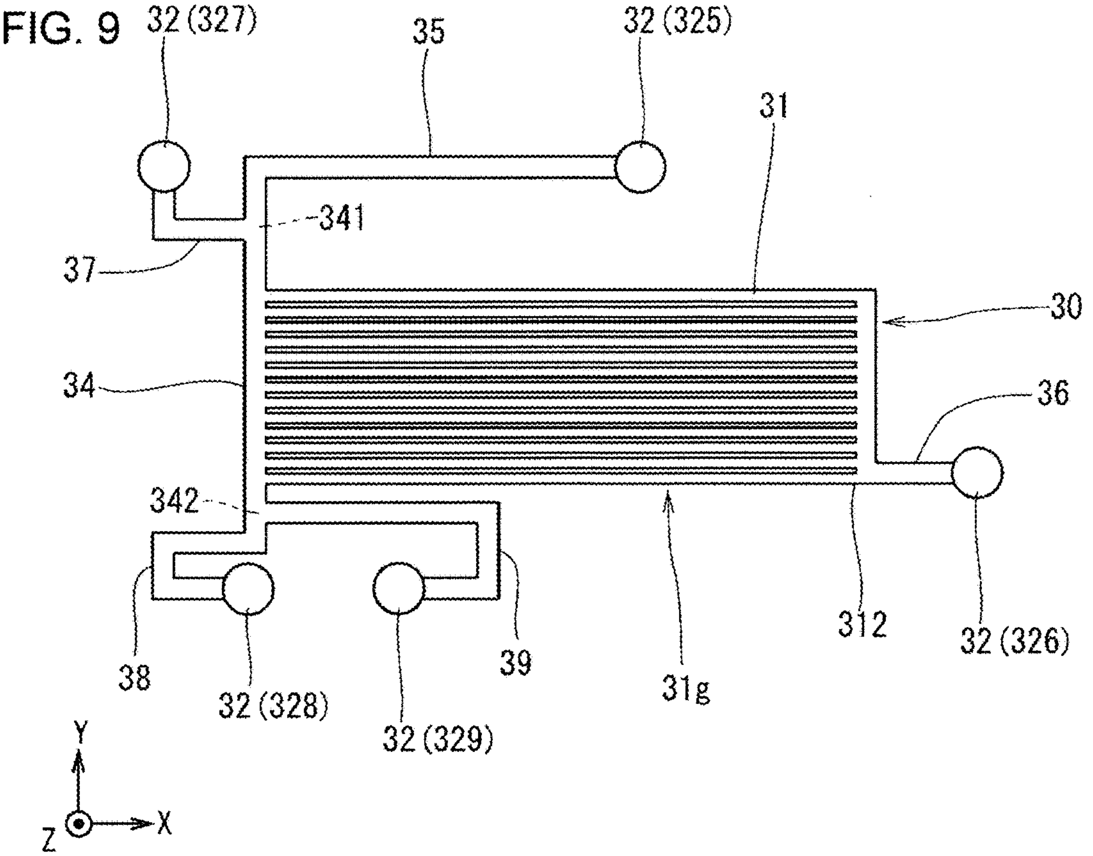
FIG. 9 is a schematic plan view of the first flow path device, illustrating its example state before the start of the pretreatment process.
Figure 10:
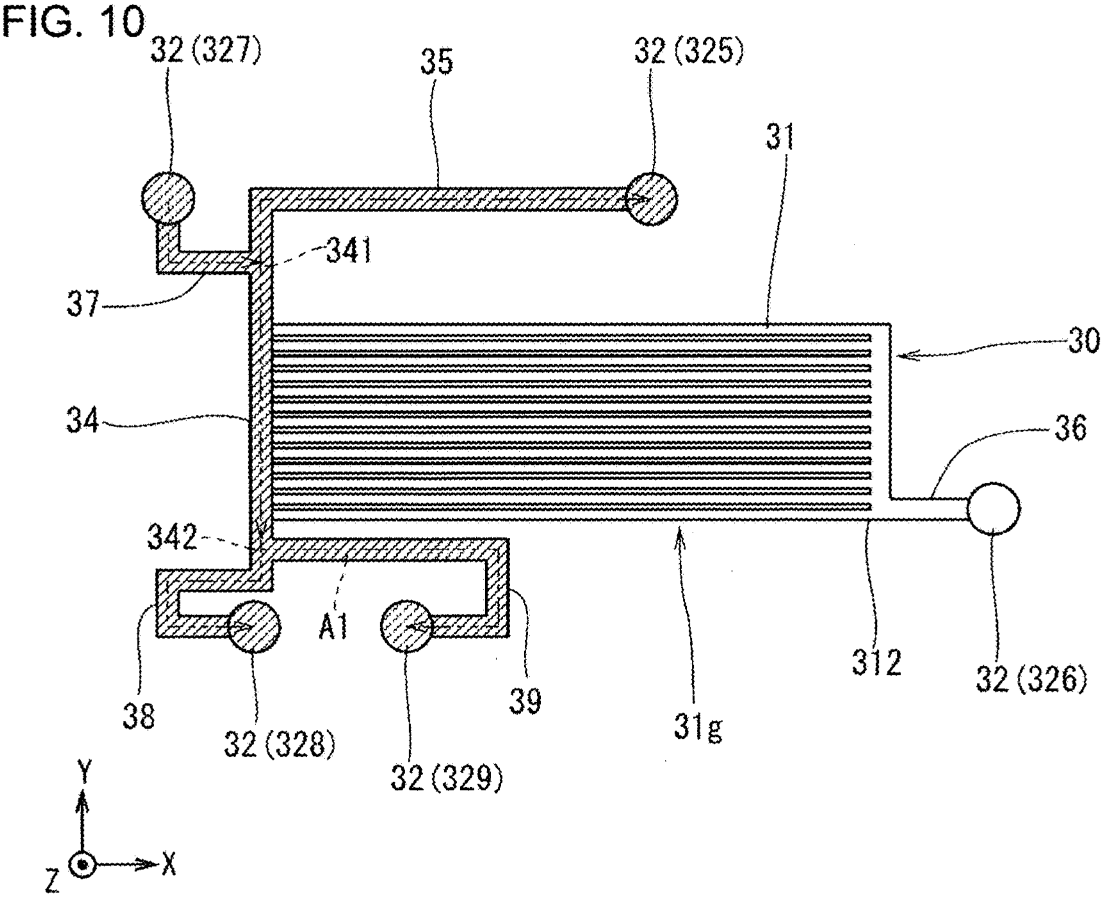
FIG. 10 is a schematic plan view of the first flow path device, illustrating its example state in a first stage of the pretreatment process.
Figure 11:
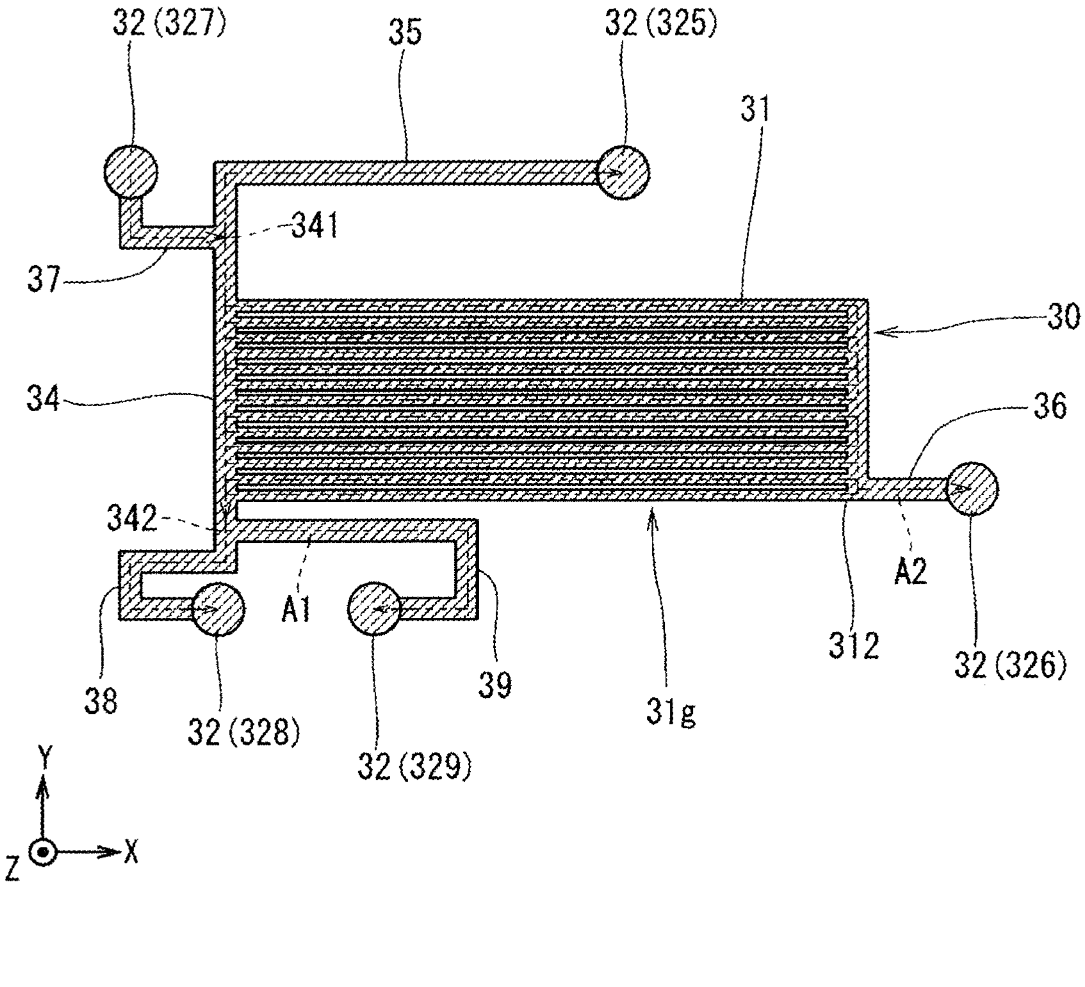
FIG. 11 is a schematic plan view of the first flow path device, illustrating its example state in a second stage of the pretreatment process.

FIGS. 9 to 11 are schematic diagrams of the first flow path device 3, illustrating an example change in the state of the pretreatment liquid introduced in the pretreatment process. In FIGS. 9 to 11, the outer edge of the first flow path device 3 is not illustrated, and the outer edges of the flow path portion 30, the two inlet holes 325 and 327, and the three outlet holes 326, 328, and 329 are drawn with solid lines. FIG. 9 is a schematic plan view of the first flow path device 3, illustrating its example state before the start of the pretreatment process. FIG. 10 is a schematic plan view of the first flow path device 3, illustrating its example state in a first stage of the pretreatment process. FIG. 11 is a schematic plan view of the first flow path device 3, illustrating its example state in a second stage of the pretreatment process. In FIGS. 10 and 11, the area with the pretreatment liquid is hatched with diagonal lines from the lower left to the upper right. In FIGS. 10 and 11, the direction in which the pretreatment liquid flows is indicated by arrows drawn with thin two-dot-dash lines.

In step S121, the first liquid feeder 4 starts an operation (also referred to as a feeding operation) for feeding the pretreatment liquid to the main flow path 34 through the inlet hole 327. This causes the pretreatment liquid to be fed through the inlet hole 327 to the main flow path 34 through the flow path 37. In this example, the first liquid feeder 4 feeds the pretreatment liquid toward the main flow path 34 through the inlet hole 327 at the first feed rate. The first feed rate is set to, for example, 100 to 400 microliters per minute (μl/min). The first feed rate may be, for example, constant or may slightly change over time.

In this example, each of the branch flow paths 31 in the flow path portion 30 has a smaller width than the other flow paths and contains air that causes the pretreatment liquid to flow less easily inside the branch flow path 31. Thus, as illustrated in FIG. 10, the pretreatment liquid fed through the inlet hole 327 to the main flow path 34 through the flow path 37 flows toward the inlet hole 325 through the flow path 35, toward the outlet hole 329 through the main flow path 34 and the flow path 39 sequentially, and toward the outlet hole 328 through the main flow path 34 and the flow path 38 sequentially.

In step S122, determination is performed as to whether the pretreatment liquid reaches the outlet hole 329 and the outlet hole 328. For example, this determination may be achieved by the controller 7 that determines whether a first predetermined period elapses from the start of the feeding operation performed by the first liquid feeder 4 or whether the feed amount of the pretreatment liquid fed by the first liquid feeder 4 reaches a first predetermined amount after the start of the feeding operation performed by the first liquid feeder 4. The first predetermined period and the first predetermined amount may be set based on, for example, the results of an experiment conducted using the first flow path device 3 or simulation with the first flow path device 3.

For example, the determination in step S122 is repeated until the pretreatment liquid reaches the outlet hole 329 and the outlet hole 328. For example, the determination in step S122 is repeated until the first predetermined period elapses from the start of the feeding operation performed by the first liquid feeder 4 or until the feed amount of the pretreatment liquid fed by the first liquid feeder 4 reaches the first predetermined amount after the start of the feeding operation performed by the first liquid feeder 4.

When the pretreatment liquid reaches the outlet hole 329 and the outlet hole 328, the processing advances to step S123. For example, the processing advances to step S123 when the first predetermined period elapses from the start of the feeding operation performed by the first liquid feeder 4 or when the feed amount of the pretreatment liquid fed by the first liquid feeder 4 reaches the first predetermined amount after the start of the feeding operation performed by the first liquid feeder 4. An area (also referred to as a first area) A1 from the inlet hole 327 through the main flow path 34 to the two outlet holes 328 and 329 is thus filled with the pretreatment liquid.

For example, the first area A1 may include the two outlet holes 328 and 329. In this case, when the first area A1 is filled with the pretreatment liquid, each of the flow paths and each of the holes 32 in the first area A1 may contain air bubbles or air without dividing the pretreatment liquid. For example, when the first area A1 does not include the outlet holes 328 and 329 and when the first area A1 is filled with the pretreatment liquid, each of the flow paths and the inlet hole 327 in the first area A1 may contain air bubbles or air without dividing the pretreatment liquid.

In step S123, the liquid suction unit 5 starts an operation (also referred to as a sucking operation) for sucking the pretreatment liquid from the main flow path 34 through the multiple branch flow paths 31 and the outlet hole 326. In other words, the liquid suction unit 5 starts the sucking operation after the pretreatment liquid is fed by the first liquid feeder 4 from the inlet hole 327 through the main flow path 34 to the outlet holes 328 and 329. In this example, the liquid suction unit 5 sucks the pretreatment liquid from the main flow path 34 through the branch flow paths 31 and the outlet hole 326 at the first suction rate. The first suction rate is set to be lower than or equal to the first feed rate. Thus, the liquid suction unit 5 sucks the pretreatment liquid from the main flow path 34 through the branch flow paths 31 and the outlet hole 326 at the first suction rate lower than or equal to the first feed rate, while the first liquid feeder 4 is feeding the pretreatment liquid toward the main flow path 34 through the inlet hole 327 at the first feed rate. The first suction rate is set to, for example, 50 to 200 μl/min. The first suction rate may be, for example, constant or may slightly change over time.

In this example, in the flow path portion 30, the pretreatment liquid forcibly flows through each of the branch flow paths 31 through the sucking operation performed by the liquid suction unit 5, although each of the branch flow paths 31 has the smaller width than the other flow paths in this example. More specifically, as illustrated in FIG. 11, the pretreatment liquid flows from the main flow path 34 toward the outlet hole 326 through the branch flow paths 31 and the flow path 36 sequentially. Thus, after the first area A1 from the inlet hole 327 through the main flow path 34 to the two outlet holes 328 and 329 is filled with the pretreatment liquid, an area (also referred to as a second area) A2 from the main flow path 34 through each of the branch flow paths 31 to the outlet hole 326 can be filled with the pretreatment liquid.

For example, the second area A2 may include the outlet hole 326. In this case, when the second area A2 is filled with the pretreatment liquid, each of the flow paths and the outlet hole 326 in the second area A2 may contain air bubbles or air without dividing the pretreatment liquid. For example, when the second area A2 does not include the outlet hole 326 and when the second area A2 is filled with the pretreatment liquid, each of the flow paths in the second area A2 may contain air bubbles or air without dividing the pretreatment liquid.

In the first embodiment, the liquid suction unit 5 starts the sucking operation after the pretreatment liquid is fed by the first liquid feeder 4 from the inlet hole 327 through the main flow path 34 to the two outlet holes 328 and 329. Thus, for example, after the first area A1 from the inlet hole 327 through the main flow path 34 to the two outlet holes 328 and 329 is filled with the pretreatment liquid, the second area A2 from the main flow path 34 through each of the branch flow paths 31 to the outlet hole 326 starts to be filled with the pretreatment liquid. This allows each of the first area A1 and the second area A2 to be filled with the pretreatment liquid promptly.

In step S124, determination is performed as to whether the flow path portion 30 is filled with the pretreatment liquid and the pretreatment liquid reaches all the holes 32 in the first flow path device 3. For example, this determination may be achieved by the controller 7 that determines whether a second predetermined period elapses from the start of the sucking operation performed by the liquid suction unit 5 or the start of the feeding operation performed by the first liquid feeder 4. The second predetermined period may be set based on, for example, the results of an experiment conducted using the first flow path device 3 or simulation with the first flow path device 3. When the flow path portion 30 is filled with the pretreatment liquid, for example, each of the flow paths in the flow path portion 30 may contain air bubbles or air without dividing the pretreatment liquid.

For example, the determination in step S124 is repeated until the flow path portion 30 is filled with the pretreatment liquid and the pretreatment liquid reaches all the holes 32 in the first flow path device 3. For example, the determination in step S124 is repeated until the second predetermined period elapses from the start of the sucking operation performed by the liquid suction unit 5 or the start of the feeding operation performed by the first liquid feeder 4.

When the flow path portion 30 is filled with the pretreatment liquid and the pretreatment liquid reaches all the holes 32 in the first flow path device 3, the processing advances to step S125. For example, the processing advances to step S125 when the second predetermined period elapses from the start of the sucking operation performed by the liquid suction unit 5 or the start of the feeding operation performed by the first liquid feeder 4. The first area A1 from the inlet hole 327 through the main flow path 34 to the two outlet holes 328 and 329 and the second area A2 from the main flow path 34 through each of the branch flow paths 31 to the outlet hole 326 are filled with the pretreatment liquid.

In step S125, the feeding operation performed by the first liquid feeder 4 and the sucking operation performed by the liquid suction unit 5 are stopped.

Separating Process

In the separating process in step S2, the processing target liquid is introduced into the flow path portion 30 in the first flow path device 3 through the inlet hole 325, and the pressing liquid is introduced through the inlet hole 327. For example, the processing target liquid is fed by the second liquid feeder 6 to the first upstream portion 341 in the main flow path 34 sequentially through the inlet hole 325 and the flow path 35. For example, the pressing liquid is fed by the first liquid feeder 4 to the first upstream portion 341 in the main flow path 34 sequentially through the inlet hole 327 and the flow path 37. As illustrated in FIG. 4, among the particles of multiple types contained in the processing target liquid, each of the non-target particles P200 is introduced from the main flow path 34 into any of the multiple branch flow paths 31 and is separated from the separating target particles P100. The separating target particles P100 among the particles of multiple types contained in the processing target liquid are substantially not introduced into the branch flow paths 31 but sequentially flow through the main flow path 34 and the flow path 39 and discharged out of the first flow path device 3 through the outlet hole 329.

1-4. Overview of First Embodiment

The method for preparing the first flow path device 3 according to the first embodiment includes the connecting process as the first process and the pretreatment process as the second process. In the connecting process, the first liquid feeder 4 that feeds the pretreatment liquid to the main flow path 34 through the inlet hole 327 is connected to the inlet hole 327, and the liquid suction unit 5 that sucks the pretreatment liquid from the main flow path 34 through the multiple branch flow paths 31 and the outlet hole 326 is connected to the outlet hole 326. In the pretreatment process, the liquid suction unit 5 sucks the pretreatment liquid from the main flow path 34 through the branch flow paths 31 and the outlet hole 326 at the first suction rate lower than or equal to the first feed rate, while the first liquid feeder 4 is feeding the pretreatment liquid toward the main flow path 34 through the inlet hole 327 at the first feed rate. In this example, in the flow path portion 30, the pretreatment liquid forcibly flows through each of the branch flow paths 31 through the sucking operation performed by the liquid suction unit 5, although each of the branch flow paths 31 has the smaller width than the other flow paths in this example.

Thus, the first area A1 from the inlet hole 327 through the main flow path 34 to the two outlet holes 328 and 329 and the second area A2 from the main flow path 34 through each of the branch flow paths 31 to the outlet hole 326 can be filled with the pretreatment liquid.

The method for preparing the first flow path device 3 according to the first embodiment includes, for example, a simple structure with the liquid suction unit 5 connected to the outlet hole 326 to suck the pretreatment liquid from the main flow path 34 through the multiple branch flow paths 31 being narrower than the other flow paths in the flow path portion 30 and through the outlet hole 326. For example, the liquid suction unit 5 such as a pump connected to the outlet hole 326 allows, for example, the relatively narrow branch flow paths 31 in the flow path portion 30 in the first flow path device 3 to be promptly filled with the pretreatment liquid.

This eliminates, for example, complicated work such as strict time management for feeding the pretreatment liquid to the main flow path 34 within a predetermined allowable period after the first flow path device 3 being vacuum-packed is removed from its package. This also eliminates a complex device to place the first flow path device 3 in a vacuum chamber immediately before the first flow path device 3 is used, decompress the vacuum chamber with a vacuum pump, and evacuate the flow path portion 30. This also eliminates a complex device and complicated control to evacuate the flow path portion 30, immediately before the first flow path device 3 is used, with a vacuum pump connected to, of the multiple holes 32, some of the openings of the holes continuous with the flow path portion 30 in the first flow path device 3 while all the other holes are closed.

This allows, for example, each of the relatively narrow branch flow paths 31 in the flow path portion 30 in the first flow path device 3 to be easily filled with the pretreatment liquid.

2. Other Embodiments

The present disclosure is not limited to the first embodiment described above and may be changed or varied in various manners without departing from the spirit and scope of the present disclosure.

2-1. Second Embodiment

The first flow path device 3 according to the first embodiment as a separating device may be, for example, combined with a flow path device (also referred to as a second flow path device) 1 as a processing device to be included in a separating device 100 as a type of flow path device.

Example Schematic Structure of Flow Path Device

Figure 12:
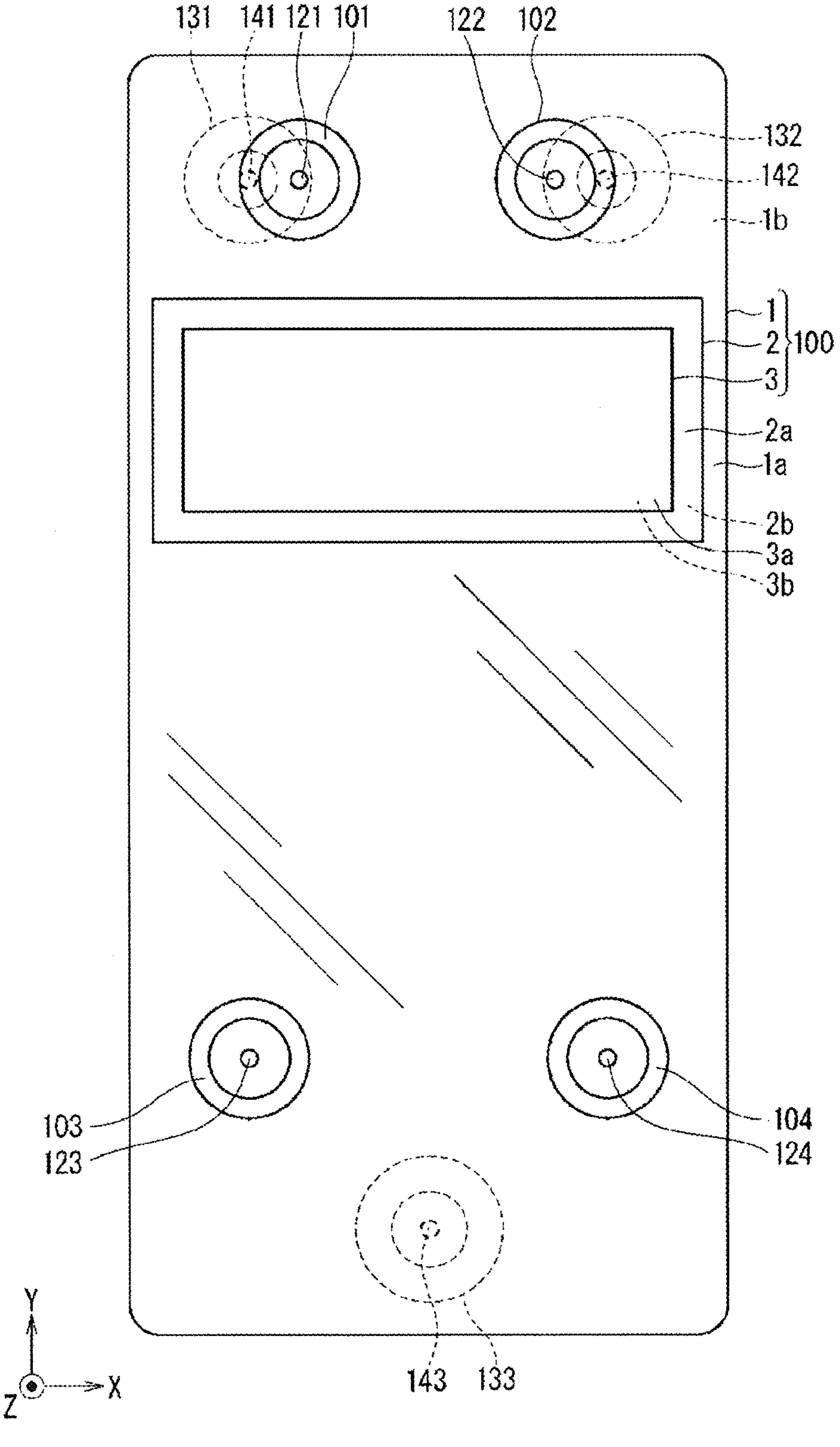
FIG. 12 is a schematic plan view of an example flow path device according to a second embodiment.

FIG. 12 is a plan view of an example of the separating device 100 according to a second embodiment.

The separating device 100 includes, for example, the first flow path device 3, a connection member 2, and a second flow path device 1. The second flow path device 1, the connection member 2, and the first flow path device 3 are stacked on one another in the stated order in the positive Z-direction. In other words, the connection member 2 is located on the second flow path device 1, and the first flow path device 3 is located on the connection member 2.

The second flow path device 1 includes a surface (also referred to as a second upper surface) 1*a* and a surface (also referred to as a second lower surface) 1*b*. The second upper surface 1*a* is located in the positive Z-direction from the second lower surface 1*b*.

The connection member 2 includes a surface (also referred to as a third upper surface) 2*a* and a surface (also referred to as a third lower surface) 2*b*. The third upper surface 2*a* is located in the positive Z-direction from the third lower surface 2*b*. The third lower surface 2*b* is in contact with the second upper surface 1*a* of the second flow path device 1. The third upper surface 2*a* is in contact with the first lower surface 3*b* of the first flow path device 3. In other words, the connection member 2 is between the first lower surface 3*b* of the first flow path device 3 and the second upper surface 1*a* of the second flow path device 1. The third lower surface 2*b* is bonded to the second upper surface 1*a* by, for example, plasma bonding or optical bonding. The first lower surface 3*b* is bonded to the third upper surface 2*a* by, for example, plasma bonding or optical bonding. For the plasma bonding described above, for example, oxygen plasma is used. For the optical bonding described above, for example, ultraviolet light from an excimer lamp is used.

The second flow path device 1 and the connection member 2 each have an outer shape of a rectangular plate as viewed in plan, similarly to, for example, the first flow path device 3. For example, the second upper surface 1*a*, the second lower surface 1*b*, the third upper surface 2*a*, and the third lower surface 2*b* are perpendicular to the positive Z-direction, similarly to the first upper surface 3*a* and the first lower surface 3*b*.

Figure 13:
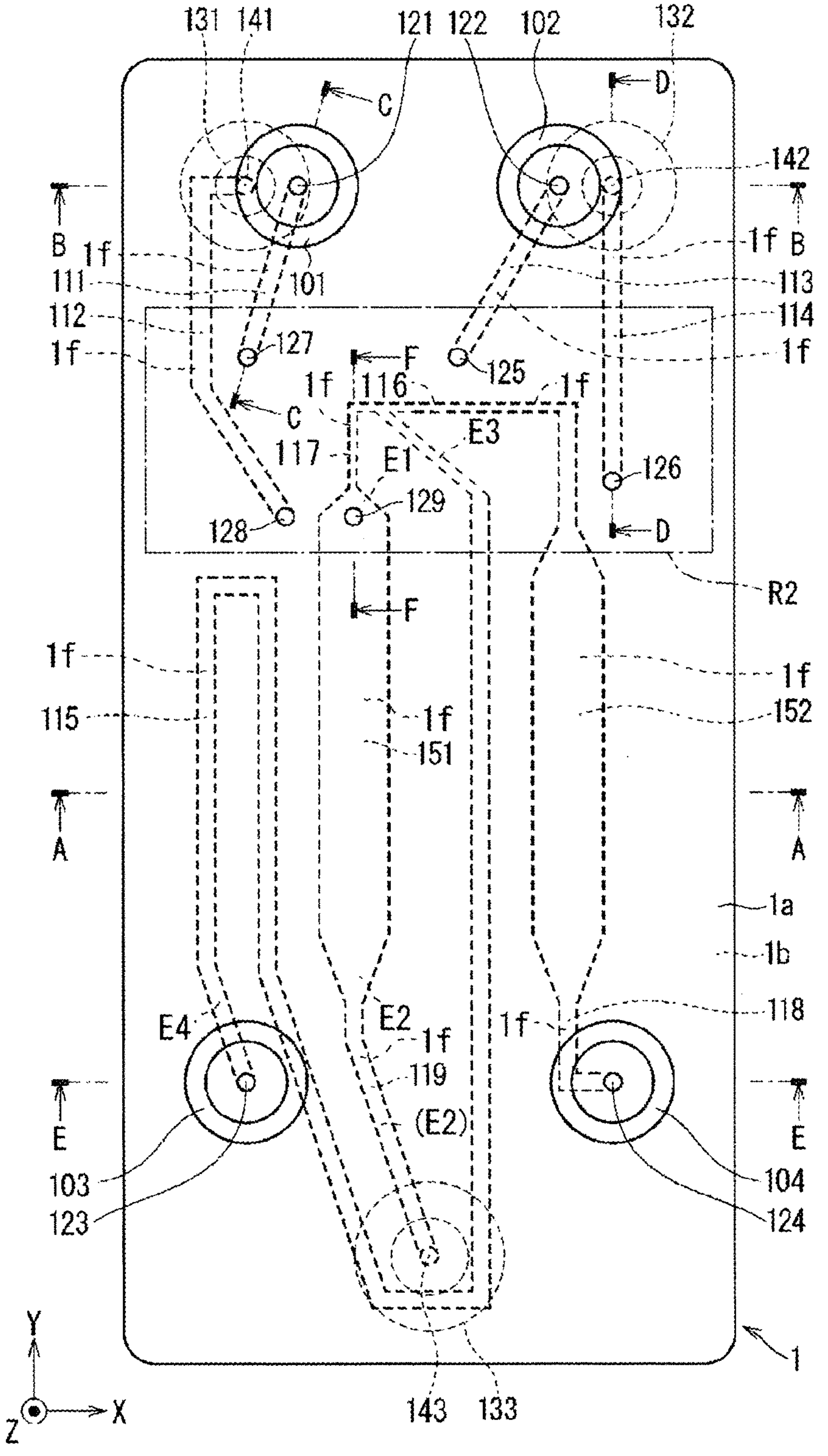
FIG. 13 is a schematic plan view of an example second flow path device.
Figure 14:
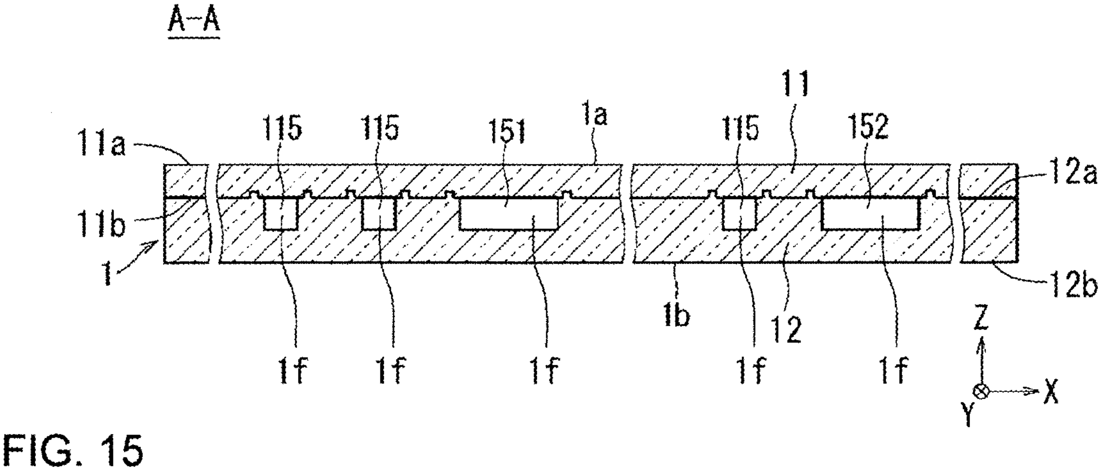
FIG. 14 is a schematic imaginary example cross-sectional view of the flow path device at position A-A as viewed in a positive Y-direction.
Figure 15:
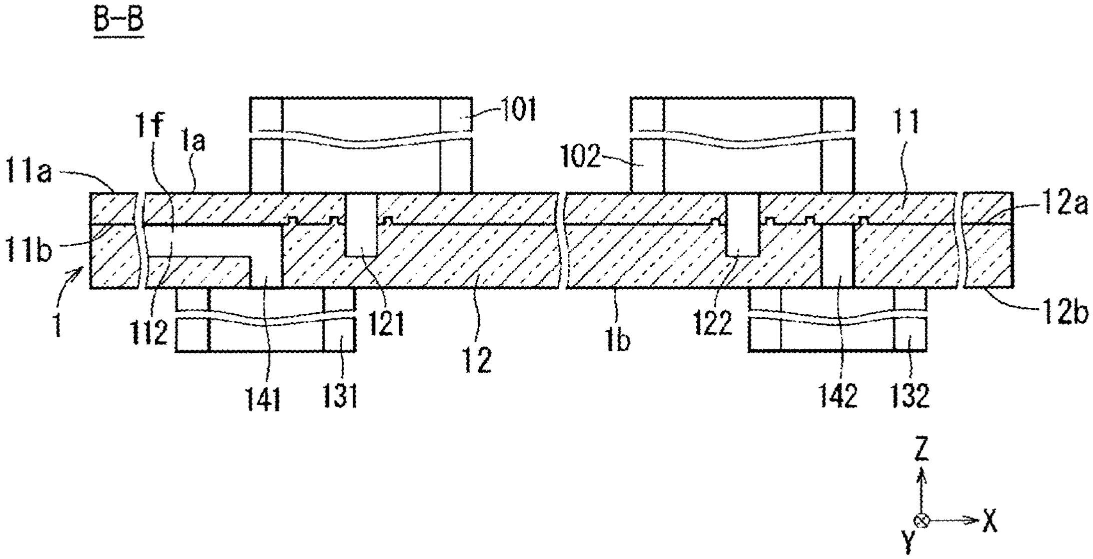
FIG. 15 is a schematic imaginary example cross-sectional view of the flow path device at position B-B as viewed in the positive Y-direction.
Figure 16:
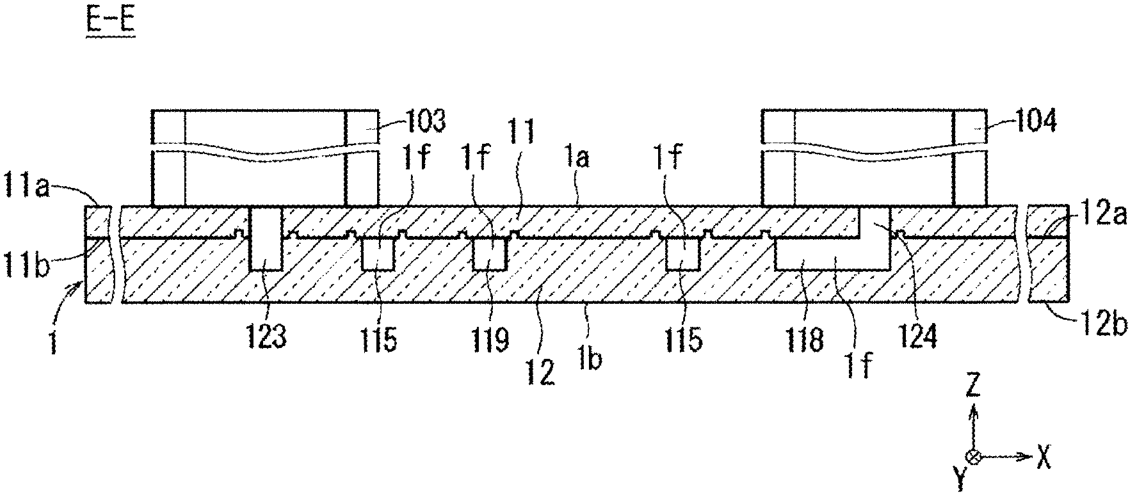
FIG. 16 is a schematic imaginary example cross-sectional view of the flow path device at position E-E as viewed in the positive Y-direction.
Figure 17:
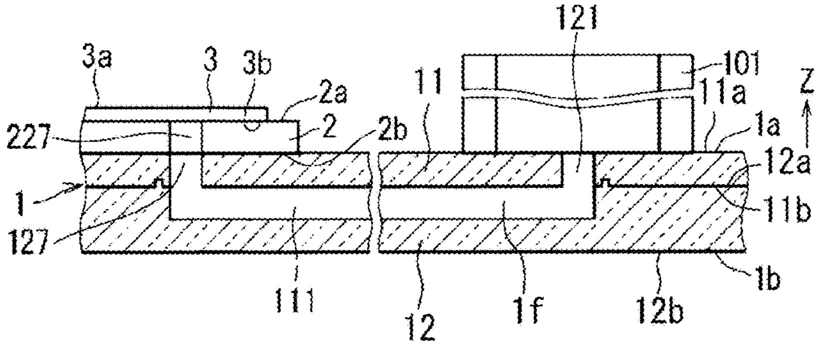
FIG. 17 is a schematic imaginary example cross-sectional view of the flow path device at position C-C as viewed in a direction perpendicular to a positive Z-direction.
Figure 18:
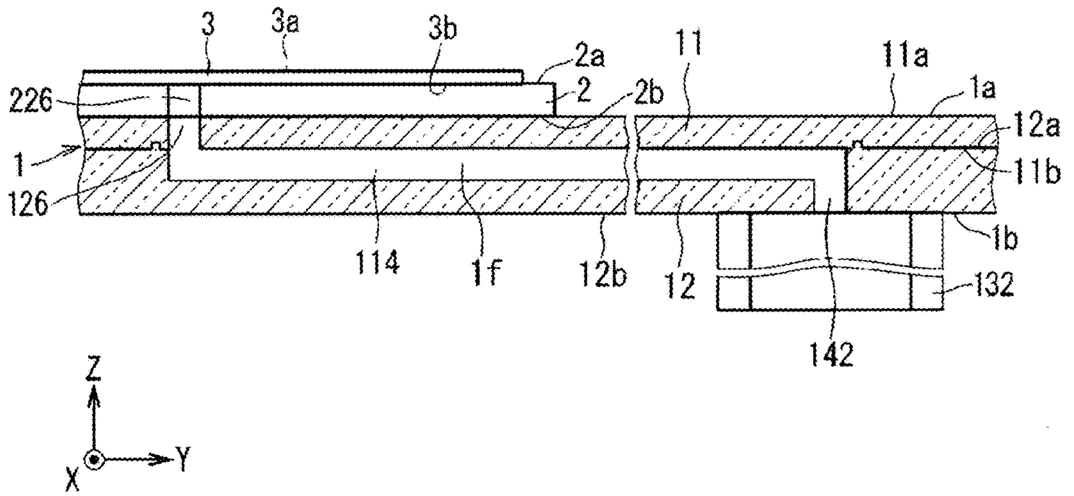
FIG. 18 is a schematic imaginary example cross-sectional view of the flow path device at position D-D as viewed in a negative X-direction.
Figure 19:
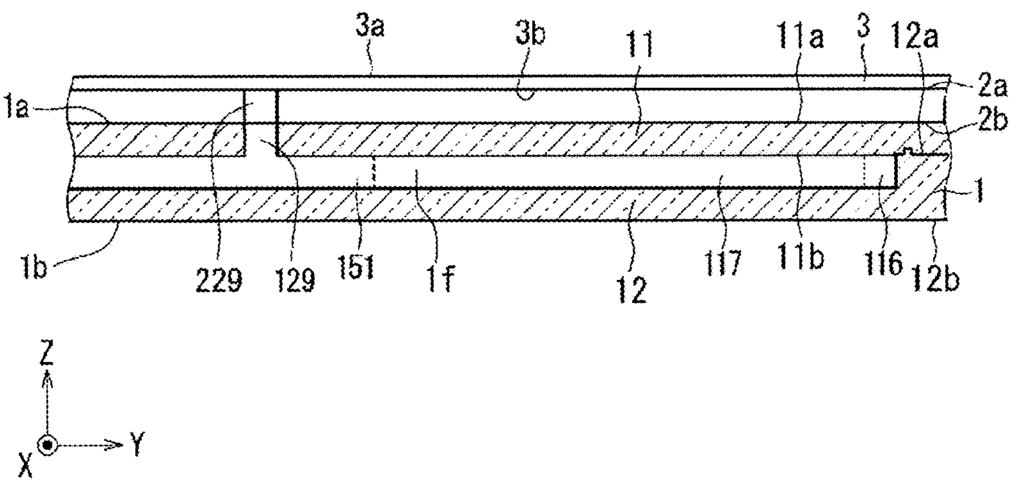
FIG. 19 is a schematic imaginary example cross-sectional view of the flow path device at position F-F as viewed in the negative X-direction.

FIG. 13 is a schematic plan view of an example of the second flow path device 1. In FIG. 13, a rectangular area R2 defined by a dot-dash line is an area in which the third lower surface 2*b* of the connection member 2 is bonded on the second upper surface 1*a*. In the second flow path device 1, for example, an area of the second upper surface 1*a* other than the area R2, the second lower surface 1*b*, and side surfaces connecting the second upper surface 1*a* and the second lower surface 1*b* serve as an outer surface of the separating device 100.

The second flow path device 1 has a thickness of, for example, about 0.5 to 5 mm. The thickness of the second flow path device 1 refers to the dimension of the second flow path device 1 in the positive Z-direction. The second upper surface 1*a* and the second lower surface 1*b* each have a width of, for example, about 10 to 50 mm. The width of the second upper surface 1*a* refers to the dimension of the second upper surface 1*a* in the positive X-direction. The width of the second lower surface 1*b* refers to the dimension of the second lower surface 1*b* in the positive X-direction. The second upper surface 1*a* and the second lower surface 1*b* each have a length of, for example, about 20 to 100 mm. The length of the second upper surface 1*a* refers to the dimension of the second upper surface 1*a* in the positive Y-direction. The length of the second lower surface 1*b* refers to the dimension of the second lower surface 1*b* in the positive Y-direction.

The second flow path device 1 includes, for example, six inlet holes 121, 122, 124, 126, 128, and 129, two outlet holes 125 and 127, and a mixing-fluid hole 123. The three inlet holes 126, 128, and 129 and the two outlet holes 125 and 127 are each open in the second upper surface 1*a* in the area R2. The three inlet holes 121, 122, and 124 and the mixing-fluid hole 123 are each open in the second upper surface 1*a* outside the area R2. In other words, any of the six inlet holes

121, 122, 124, 126, 128, and 129, the two outlet holes 125 and 127, and the mixing-fluid hole 123 is not open in the second lower surface 1*b*.

The second flow path device 1 includes, for example, three outlet holes 141, 142, and 143. The three outlet holes 141, 142, and 143 are each open in the second lower surface 1*b* outside the area R2. In other words, any of the outlet holes 141, 142, and 143 is not open in the second upper surface 1*a*.

The second flow path device 1 includes, for example, multiple flow paths 1*f*. The multiple flow paths 1*f* include, for example, a mixing flow path 115, eight flow paths 111, 112, 113, 114, 116, 117, 118, and 119, a measurement flow path 151, and a reference flow path 152. The multiple flow paths 1*f* are each a groove that is not open in either the second upper surface 1*a* or the second lower surface 1*b*.

The flow path 111 is continuous with the inlet hole 121 and the outlet hole 127. The flow path 112 is continuous with the inlet hole 128 and the outlet hole 141. The flow path 113 is continuous with the inlet hole 122 and the outlet hole 125. The flow path 114 is continuous with the inlet hole 126 and the outlet hole 142.

The measurement flow path 151 is between the flow path 117 and the flow path 119. The measurement flow path 151 has a direction (also referred to as a first longitudinal direction) in which the measurement flow path 151 extends. In the example in FIG. 13, the first longitudinal direction is parallel to the negative Y-direction from the flow path 117 toward the flow path 119. In other words, the measurement flow path 151 extends in the negative Y-direction. The measurement flow path 151 has an end in the positive Y-direction connected to the flow path 117 and an end in the direction opposite to the positive Y-direction (in the negative Y-direction) connected to the flow path 119. The measurement flow path 151 is connected to the flow path 117 at a position overlapping the area R2 as viewed in plan.

The measurement flow path 151 includes an area (also referred to as a first end area) E1 located at one end in the first longitudinal direction and an area (also referred to as a second end area) E2 at the other end opposite to the first end area E1 in the first longitudinal direction. In other words, the measurement flow path 151 includes the first end area E1 and the second end area E2 opposite to each other in the first longitudinal direction. In the example in FIG. 13, the first end area E1 is located at the end of the measurement flow path 151 in the positive Y-direction, and the second end area E2 is located at the end of the measurement flow path 151 in the negative Y-direction. The inlet hole 129 is connected to the first end area E1 in the measurement flow path 151. Thus, the inlet hole 129 is connected to the measurement flow path 151 and open in the second upper surface 1*a*.

The measurement flow path 151 is connected to the flow path 117 in the first end area E1. In the example in FIG. 13, the measurement flow path 151 includes the first end area E1 continuous with the mixing flow path 115 through the flow path 117 and a part of the flow path 116. "A first portion being continuous with a second portion" refers to the first portion being directly continuous with the second portion to allow a fluid to flow between the first portion and the second portion or refers to the first portion being continuous with the second portion through another portion (a third portion) to allow a fluid to flow between the first portion and the second portion. Thus, the measurement flow path 151 includes the first end area E1 continuous with the mixing flow path 115.

The flow path 116 is between the flow path 117 and the reference flow path 152 and is connected to the mixing flow path 115 between the flow path 117 and the reference flow path 152. The flow path 117 is between the measurement flow path 151 and the flow path 116. The flow path 118 is connected to the inlet hole 124 and is between the inlet hole 124 and the reference flow path 152. The flow path 119 is between the outlet hole 143 and the measurement flow path 151 and is connected to the outlet hole 143. Thus, the outlet hole 143 is continuous with the measurement flow path 151 through the flow path 119 and is open in the second lower surface 1*b*. More specifically, the outlet hole 143 is continuous with the second end area E2 in the measurement flow path 151 through the flow path 119.

The mixing flow path 115 is between the mixing-fluid hole 123 and the flow path 116. The mixing flow path 115 has a direction (also referred to as a second longitudinal direction) in which the mixing flow path 115 extends. The mixing flow path 115 bends in the example in FIG. 13. More specifically, the mixing flow path 115 extends in different directions from the mixing-fluid hole 123 to the flow path 116, extending in the positive Y-direction, in the positive X-direction, in the negative Y-direction, in the positive X-direction, and then in the positive Y-direction.

The mixing flow path 115 includes an area (also referred to as a third end area) E3 at one end in the second longitudinal direction and an area (also referred to as a fourth end area) E4 at the other end opposite to the third end area E3 in the second longitudinal direction. In other words, the mixing flow path 115 includes the third end area E3 and the fourth end area E4 opposite to each other in the second longitudinal direction. The mixing flow path 115 is continuous with the measurement flow path 151 in the third end area E3 through a part of the flow path 116 and the flow path 117. The mixing flow path 115 is connected to the mixing-fluid hole 123 in the fourth end area E4. Thus, the mixing-fluid hole 123 is continuous with the fourth end area E4 in the mixing flow path 115 and is open in the second upper surface 1*a*.

The reference flow path 152 is between the flow path 116 and the flow path 118. The reference flow path 152 extends in the positive Y-direction. The reference flow path 152 has an end in the positive Y-direction connected to the flow path 116 and an end in the direction opposite to the positive Y-direction (in the negative Y-direction) connected to the flow path 118. In the example in FIG. 13, the measurement flow path 151 and the reference flow path 152 both extend in the positive Y-direction. However, the measurement flow path 151 and the reference flow path 152 may extend in different directions.

FIGS. 14 to 19 are imaginary cross-sectional views of the separating device 100.

The second flow path device 1 includes, for example, a first plate 11 and a second plate 12 stacked on each other. In other words, in the examples in FIGS. 14 to 19, the first plate 11 and the second plate 12 are stacked on each other in the stated order in the negative Z-direction. The first plate 11 includes a first surface 11*a* and a second surface 11*b* opposite to the first surface 11*a*. The first surface 11*a* is located in the positive Z-direction from the second surface 11*b*. The second plate 12 includes a third surface 12*a* and a fourth surface 12*b* opposite to the third surface 12*a*. The third surface 12*a* is located in the positive Z-direction from the fourth surface 12*b*.

The first plate 11 and the second plate 12 are bonded together with the third surface 12*a* partially bonded to the second surface 11*b*. The first plate 11 and the second plate 12 thus form the second flow path device 1 being integral. The first plate 11 and the second plate 12 may be bonded with, for example, any welding method such as ultrasonic welding, laser welding, heat welding, or diffusion welding. In the second flow path device 1, the first surface 11*a* corresponds to the second upper surface 1*a*, and the fourth surface 12*b* corresponds to the second lower surface 1*b*. The multiple flow paths 1*f* are each defined between the second surface 11*b* and the third surface 12*a*. More specifically, the mixing flow path 115, the eight flow paths 111, 112, 113, 114, 116, 117, 118, and 119, the measurement flow path 151, and the reference flow path 152 are each defined between the second surface 11*b* and the third surface 12*a*. The six inlet holes 121, 122, 124, 126, 128, and 129, the two outlet holes 125 and 127, and the mixing-fluid hole 123 each extend through the first plate 11. The three outlet holes 141, 142, and 143 each extend through the second plate 12.

The mixing flow path 115 extends from the mixing-fluid hole 123 substantially in the positive Y-direction, in the positive X-direction by a short distance, substantially in the negative Y-direction, in the positive X-direction by a short distance, substantially in the positive Y-direction, and then to the flow path 116 and is connected to the flow path 116. The portion of the mixing flow path 115 connected to the flow path 116 inclines in the negative X-direction with respect to the positive Y-direction as the mixing flow path 115 extends in the positive Y-direction. The portion in the flow path 116 connected to the mixing flow path 115 extends in the negative X-direction. The flow path 116 and the mixing flow path 115 define a minor angle (also referred to as a first minor angle) at a position nearer the flow path 117. The flow path 116 and the mixing flow path 115 also define a minor angle (also referred to as a second minor angle) at a position opposite to the flow path 117. The first minor angle is greater than the second minor angle. This structure allows a liquid forced out of the mixing flow path 115 to the flow path 116 to easily move toward the measurement flow path 151 through the flow path 117. A flow path with less bending allows easier flow of a liquid.

The second flow path device 1 includes four cylinders 101, 102, 103, and 104 protruding from the second upper surface 1*a* in the positive Z-direction. The cylinder 101 surrounds the inlet hole 121 about the Z-axis as viewed in plan. The cylinder 102 surrounds the inlet hole 122 about the Z-axis as viewed in plan. The cylinder 103 surrounds the mixing-fluid hole 123 about Z-axis as viewed in plan. The cylinder 104 surrounds the inlet hole 124 about the Z-axis as viewed in plan.

The second flow path device 1 includes three cylinders 131, 132, and 133 protruding from the second lower surface 1*b* in the direction (negative Z-direction) opposite to the positive Z-direction. The cylinder 131 surrounds the outlet hole 141 about the Z-axis as viewed in plan. The cylinder 132 surrounds the outlet hole 142 about the Z-axis as viewed in plan. The cylinder 133 surrounds the outlet hole 143 about the Z-axis as viewed in plan.

Figure 20:
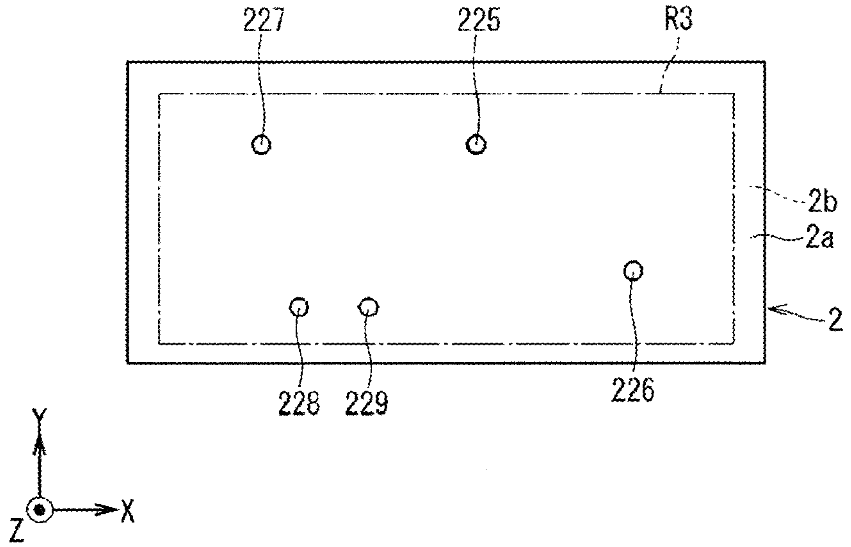
FIG. 20 is a schematic plan view of an example connection member.

FIG. 20 is a plan view of an example of the connection member 2. In FIG. 20, a rectangular area R3 defined by a dot-dash line is an area in which the first lower surface 3*b* is bonded.

The connection member 2 includes five through-holes 225, 226, 227, 228, and 229. The five through-holes 225, 226, 227, 228, and 229 each extend through from the third upper surface 2*a* to the third lower surface 2*b* in the area R3. The connection member 2 is, for example, in the form of a sheet.

The through-hole 227 is connected to the outlet hole 127 and to the inlet hole 327. In other words, the through-hole 227 connects the outlet hole 127 and the inlet hole 327. Thus, the inlet hole 327 is continuous with the inlet hole 121 through the through-hole 227, the outlet hole 127, and the flow path 111 in the stated order.

The through-hole 225 is connected to the outlet hole 125 and to the inlet hole 325. In other words, the through-hole 225 connects the outlet hole 125 and the inlet hole 325. Thus, the inlet hole 325 is continuous with the inlet hole 122 through the through-hole 225, the outlet hole 125, and the flow path 113 in the stated order.

The through-hole 226 is connected to the inlet hole 126 and to the outlet hole 326. In other words, the through-hole 226 connects the outlet hole 326 and the inlet hole 126. Thus, the outlet hole 326 is continuous with the outlet hole 142 through the through-hole 226, the inlet hole 126, and the flow path 114 in the stated order.

The through-hole 229 is connected to the inlet hole 129 and to the outlet hole 329. In other words, the through-hole 229 connects the outlet hole 329 and the inlet hole 129. Thus, the outlet hole 329 is continuous with the measurement flow path 151 through the through-hole 229 and the inlet hole 129 in the stated order.

The through-hole 228 is connected to the inlet hole 128 and to the outlet hole 328. In other words, the through-hole 228 connects the outlet hole 328 and the inlet hole 128. Thus, the outlet hole 328 is continuous with the outlet hole 141 through the through-hole 228, the inlet hole 128, and the flow path 112 in the stated order.

Overall Example Functions of Flow Path Device

The functions of the separating device 100 are roughly described below.

As described above, the processing target liquid containing the particles P100 and P200 of multiple types is introduced into the first flow path device 3. The first flow path device 3 separates the separating target particles P100 from the non-target particles P200 and discharges the separating target particles P100.

The second flow path device 1 is used to perform, for example, predetermined processing on the separating target particles P100. The predetermined processing is, for example, to count the number of separating target particles P100 (count detection). To describe the processing, the separating target particles P100 and the liquid containing the separating target particles P100 are each hereafter also referred to as "a sample". The liquid containing the separating target particles P100 as the particles of the specific type is hereafter also referred to as "a particle-containing liquid".

The connection member 2 guides the separating target particles P100 (more specifically, the sample) discharged from the first flow path device 3 to the second flow path device 1.

In the second embodiment, for example, the pretreatment liquid is introduced through the inlet hole 121 as preparation before the processing target liquid is introduced into the separating device 100. The pretreatment liquid may facilitate cleaning of the separating device 100 and smooth movement of the processing target liquid and the sample in the first flow path device 3. For example, when the processing target liquid is introduced into the separating device 100, the pressing liquid is introduced into the separating device 100 through the inlet hole 121. The pretreatment liquid or the pressing liquid introduced into the separating device 100 through the inlet hole 121 flows through the flow path 111, the outlet hole 127, the through-hole 227, the inlet hole 327, and the flow path 37 in the stated order, and then flows into the main flow path 34.

When the pretreatment liquid or the pressing liquid is introduced into the separating device 100 through the inlet hole 121, for example, the first liquid feeder 4 may be connected to the inlet hole 121 to feed the pretreatment liquid or the pressing liquid from the inlet hole 327 through the flow path 37 to the main flow path 34. In other words, the first liquid feeder 4 may be connected to the inlet hole 327 through the inlet hole 121, the flow path 111, the outlet hole 127, and the through-hole 227. Thus, in the second embodiment, the first liquid feeder 4 can be indirectly connected to the inlet hole 327 by connecting the first liquid feeder 4 to the inlet hole 121. In this case, for example, the tube 4*c* to connect the first liquid feeder 4 to the inlet hole 121 may be externally connected to the separating device 100. The tube 4*c* connecting the first liquid feeder 4 to the inlet hole 121 refers to the tube 4C allowing a fluid to flow between the first liquid feeder 4 and the inlet hole 121. The tube 4*c* may be connected using, for example, the cylinder 101.

In the second embodiment, for example, the first liquid feeder 4 may introduce the pretreatment liquid into the separating device 100 through the inlet hole 121 by feeding the pretreatment liquid into the main flow path 34 through the inlet hole 121, the flow path 111, the outlet hole 127, the through-hole 227, the inlet hole 327, and the flow path 37 at the first feed rate. In other words, for example, the first liquid feeder 4 can perform the operation (feeding operation) for feeding the pretreatment liquid toward the main flow path 34 through the inlet hole 327 at the first feed rate.

When the pretreatment liquid is introduced into the separating device 100 through the inlet hole 121, for example, the liquid suction unit 5 may be connected to the outlet hole 142 to suck the pretreatment liquid from the main flow path 34 through the branch flow paths 31 and the outlet hole 326. In other words, the liquid suction unit 5 may be connected to the outlet hole 326 through the outlet hole 142, the flow path 114, the inlet hole 126, and the through-hole 226. Thus, in the second embodiment, the liquid suction unit 5 can be indirectly connected to the outlet hole 326 by connecting the liquid suction unit 5 to the outlet hole 142. In this case, for example, the tube 5*c* to connect the liquid suction unit 5 to the outlet hole 142 may be externally connected to the separating device 100. The tube 5*c* connecting the liquid suction unit 5 to the outlet hole 142 refers to the tube 5*c* allowing a fluid to flow between the liquid suction unit 5 and the outlet hole 142. The tube 5*c* may be connected using, for example, the cylinder 132.

In the second embodiment, for example, the liquid suction unit 5 can suck the pretreatment liquid from the main flow path 34 through the branch flow paths 31, the flow path 36, the outlet hole 326, the through-hole 226, the inlet hole 126, the flow path 114, and the outlet hole 142 at the first suction rate lower than or equal to the first feed rate. In other words, for example, the liquid suction unit 5 can perform the operation (sucking operation) for sucking the pretreatment liquid from the main flow path 34 through the branch flow paths 31 and the outlet hole 326 at the first suction rate lower than or equal to the first feed rate.

In the second embodiment with the above structure as well, for example, the process (first process) to connect the first liquid feeder 4 to the inlet hole 327 and the liquid suction unit 5 to the outlet hole 326 can be performed as illustrated in FIGS. 6 and 8 as in the first embodiment. For example, as illustrated in FIG. 7 and FIGS. 9 to 11, the process (second process) includes sucking the pretreatment liquid while feeding the pretreatment liquid. The pretreatment liquid is fed by the first liquid feeder 4 toward the main flow path 34 through the inlet hole 327 at the first feed rate. The pretreatment liquid is sucked by the liquid suction unit 5 from the main flow path 34 through the branch flow paths 31 and the outlet hole 326 at the first suction rate lower than or equal to the first feed rate. In the second process, for example, the first area A1 from the inlet hole 327 through the main flow path 34 to the two outlet holes 328 and 329 and the second area A2 from the main flow path 34 through each of the branch flow paths 31 to the outlet hole 326 can be filled with the pretreatment liquid. In this case, the method for preparing the first flow path device 3 included in the separating device 100 includes, for example, the connecting process as the first process and the pretreatment process as the second process.

More specifically, in the pretreatment process as the second process, the liquid suction unit 5 can start the sucking operation after the pretreatment liquid is fed by the first liquid feeder 4 from the inlet hole 327 through the main flow path 34 to the two outlet holes 328 and 329. For example, after the first area A1 from the inlet hole 327 through the main flow path 34 to the two outlet holes 328 and 329 is filled with the pretreatment liquid, the pretreatment liquid can start to fill the second area A2 from the main flow path 34 through each of the branch flow paths 31 to the outlet hole 326. This allows each of the first area A1 and the second area A2 in the first flow path device 3 to be filled with the pretreatment liquid promptly.

In the second embodiment, for example, the processing target liquid is introduced into the separating device 100 through the inlet hole 122. The processing target liquid introduced into the separating device 100 through the inlet hole 122 flows through the flow path 113, the outlet hole 125, the through-hole 225, the inlet hole 325, and the flow path 35 in the stated order, and then flows into the main flow path 34.

When the processing target liquid is introduced into the separating device 100 through the inlet hole 122, for example, the second liquid feeder 6 may be connected to the inlet hole 122 to feed the processing target liquid to the main flow path 34 through the inlet hole 325. In other words, the second liquid feeder 6 may be connected to the inlet hole 325 through the inlet hole 122, the flow path 113, the outlet hole 125, and the through-hole 225. Thus, in the second embodiment, for example, the second liquid feeder 6 can be indirectly connected to the inlet hole 325 by connecting the second liquid feeder 6 to the inlet hole 122. In this case, for example, the tube 6*c* to connect the second liquid feeder 6 to the inlet hole 122 may be externally connected to the separating device 100. The tube 6*c* connecting the second liquid feeder 6 to the inlet hole 122 refers to the tube 6*c* allowing a fluid to flow between the second liquid feeder 6 and the inlet hole 122. The tube 6*c* may be connected using the cylinder 102.

For example, a fluid for mixing (also referred to as a mixing fluid) is fed into the separating device 100 through the mixing-fluid hole 123. For example, the mixing fluid is discharged from the separating device 100 through the mixing-fluid hole 123.

For example, a tube may be externally connected to the separating device 100 to feed and discharge the mixing fluid into and from the separating device 100 through the mixing-fluid hole 123 using the cylinder 103.

For example, a liquid for dispersion (also referred to as a dispersing liquid) is introduced into the separating device 100 through the inlet hole 124.

For example, a tube may be externally connected to the separating device 100 to introduce the dispersing liquid into the separating device 100 through the inlet hole 124 using the cylinder 104.

As described above, the first flow path device 3 separates, among the particles of multiple types in the processing target liquid, the separating target particles P100 from the non-target particles P200 and discharges the separating target particles P100.

The non-target particles P200 to be discharged through the outlet hole 326 in the first flow path device 3 flow through the through-hole 226, the inlet hole 126, and the flow path 114 in the stated order, and then are discharged through the outlet hole 142 in the second flow path device 1. The non-target particles P200 discharged through the outlet hole 142 may or may not undergo specific processing.

The separating target particles P100 to be discharged through the outlet hole 329 in the first flow path device 3 flow through the through-hole 229 and the inlet hole 129 in the stated order, and then are introduced into the measurement flow path 151 in the second flow path device 1. The inlet hole 129 is open in the second upper surface 1*a*. Thus, when the separating device 100 is used with the second upper surface 1*a* facing upward and the second lower surface 1*b* facing downward, the sample may be easily introduced into the measurement flow path 151 from above through the inlet hole 129.

In the second embodiment, the first flow path device 3 is located on the second upper surface 1*a* of the second flow path device 1. The outlet hole 329 being open in the first lower surface 3*b* of the first flow path device 3 is connected to the inlet hole 129 being open in the second upper surface 1*a* of the second flow path device 1. Thus, when the processing target liquid is introduced into the flow path portion 30 in the first flow path device 3, for example, the liquid (also referred to as the sample) containing the separating target particles P100 separated from the processing target liquid in the flow path portion 30 may be fed into the measurement flow path 151 in the second flow path device 1 through the outlet hole 329 and the inlet hole 129. This may allow, for example, separating of the sample from the processing target liquid using the first flow path device 3 and the predetermined processing on the separating target particles P100 using the second flow path device 1 to be performed efficiently.

The remaining component to be discharged through the outlet hole 328 in the first flow path device 3 flows through the through-hole 228, the inlet hole 128, and the flow path 112 in the stated order, and then is discharged through the outlet hole 141 in the second flow path device 1. The remaining component discharged through the outlet hole 141 may or may not undergo specific processing.

The dispersing liquid introduced into the separating device 100 through the inlet hole 124 flows through the flow path 118, the reference flow path 152, the flow path 116, and the flow path 117 in the stated order, and then flows into the measurement flow path 151.

The dispersing liquid disperses the separating target particles P100 introduced into the measurement flow path 151 through the inlet hole 129. "Dispersing" herein is an antonym of clumping or aggregation of the separating target particles P100. Dispersing the separating target particles P100 may allow the predetermined processing, such as counting as referred to in the second embodiment, to be performed easily or accurately, or both easily and accurately. The dispersing liquid may be the same liquid as the pressing liquid. For the processing target liquid being blood, the dispersing liquid is, for example, PBS. The dispersing liquid may be a liquid of PBS containing at least one of EDTA as the second element or BSA as the third element.

The mixing fluid introduced into the separating device 100 through the mixing-fluid hole 123 flows into the mixing flow path 115. The mixing fluid flows back and forth in the mixing flow path 115 with an external operation. The mixing fluid is, for example, air. In this case, the air pressure at the mixing-fluid hole 123 is controlled to cause the mixing fluid to flow back and forth through the mixing flow path 115.

The mixing fluid is a fluid for mixing the dispersing liquid containing the separating target particles P100 to facilitate dispersion of the sample in the dispersing liquid in an area from the mixing flow path 115 through the flow paths 116 and 117 to the measurement flow path 151. In other words, the mixing fluid is a fluid for mixing the liquid (particle-containing liquid) containing the separating target particles P100 as the particles of the specific type. The mixing fluid may be the same liquid as the dispersing liquid and the pressing liquid. For the processing target liquid being blood, the mixing fluid is, for example, PBS. In this case, PBS flows back and forth through the mixing flow path 115 as the PBS flows into and out of the mixing flow path 115 through the mixing-fluid hole 123. The mixing fluid flowing back and forth in the mixing flow path 115 facilitates mixing of the dispersing liquid and the sample in the mixing flow path 115, in the flow paths 116 and 117, and in at least a part of the measurement flow path 151.

For example, the sample containing the particles of the specific type is introduced through the inlet hole 129 into an area nearer the first end area E1 in the measurement flow path 151. The mixing fluid is repeatedly fed into and discharged from the mixing flow path 115 through the mixing-fluid hole 123, thus facilitating mixing of the dispersing liquid and the sample. The dispersing liquid being mixed with the sample may facilitate, for example, dispersion of the separating target particles P100. The mixing fluid may be a liquid of PBS containing at least one of EDTA as the second element or BSA as the third element.

The sample and the dispersing liquid move toward the flow path 119 in the measurement flow path 151. The mixing fluid, in addition to the sample and the dispersing liquid, may also move toward the flow path 119 in the measurement flow path 151. The measurement flow path 151 is used to perform the predetermined processing on the separating target particles P100. The predetermined processing may be, for example, counting the number of separating target particles P100 in the sample in a specific area in the measurement flow path 151 by optical measurement.

After the predetermined processing is performed on the separating target particles P100 in the measurement flow path 151, the sample and the dispersing liquid flow from the measurement flow path 151 through the flow path 119 and are discharged through the outlet hole 143. The outlet hole 143 is open in the fourth surface 12*b*. Thus, when the second flow path device 1 is used with the first surface 11*a* facing upward and the fourth surface 12*b* facing downward, the sample may easily flow from the measurement flow path 151 through the flow path 119 and be discharged through the outlet hole 143. The mixing fluid, in addition to the sample and the dispersing liquid, may also flow from the measurement flow path 151 through the flow path 119 and be discharged through the outlet hole 143. The separating target particles P100 discharged through the outlet hole 143 may or may not undergo specific processing.

The material for the second flow path device 1 is, for example, a resin such as a cycloolefin polymer (COP). The second flow path device 1 made of a COP may be less flexible. In this case, the materials for the first plate 11 and the second plate 12 are both COPs. The first plate 11 and the second plate 12 may each be manufactured by, for example, resin molding.

3. Others

In each of the above embodiments, in the pretreatment process as the second process, for example, the liquid suction unit 5 may start the sucking operation before the pretreatment liquid fed by the first liquid feeder 4 from the inlet hole 327 through the main flow path 34 reaches the outlet holes 328 and 329.

Figure 21:
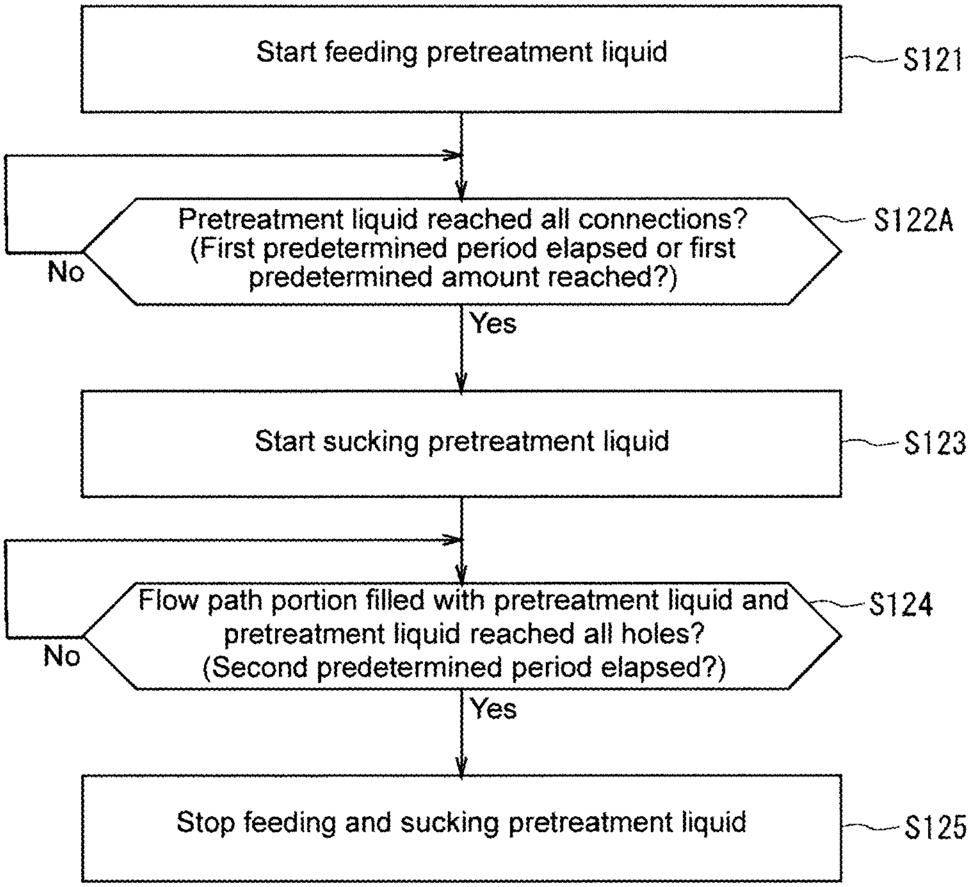
FIG. 21 is a flowchart of processing in another pretreatment process in a first example.

FIG. 21 is a flowchart of processing in another example (also referred to as a first example) of the pretreatment process performed in step S12 in FIG. 6 described above. For example, as illustrated in FIG. 21, the pretreatment process performed in step S12 includes, for example, step S121, step S122A, step S123, step S124, and step S125 performed in the stated order. The flowchart in FIG. 21 is based on the flowchart in FIG. 7 described above, with step S122 being replaced by step S122A.

Figure 22:
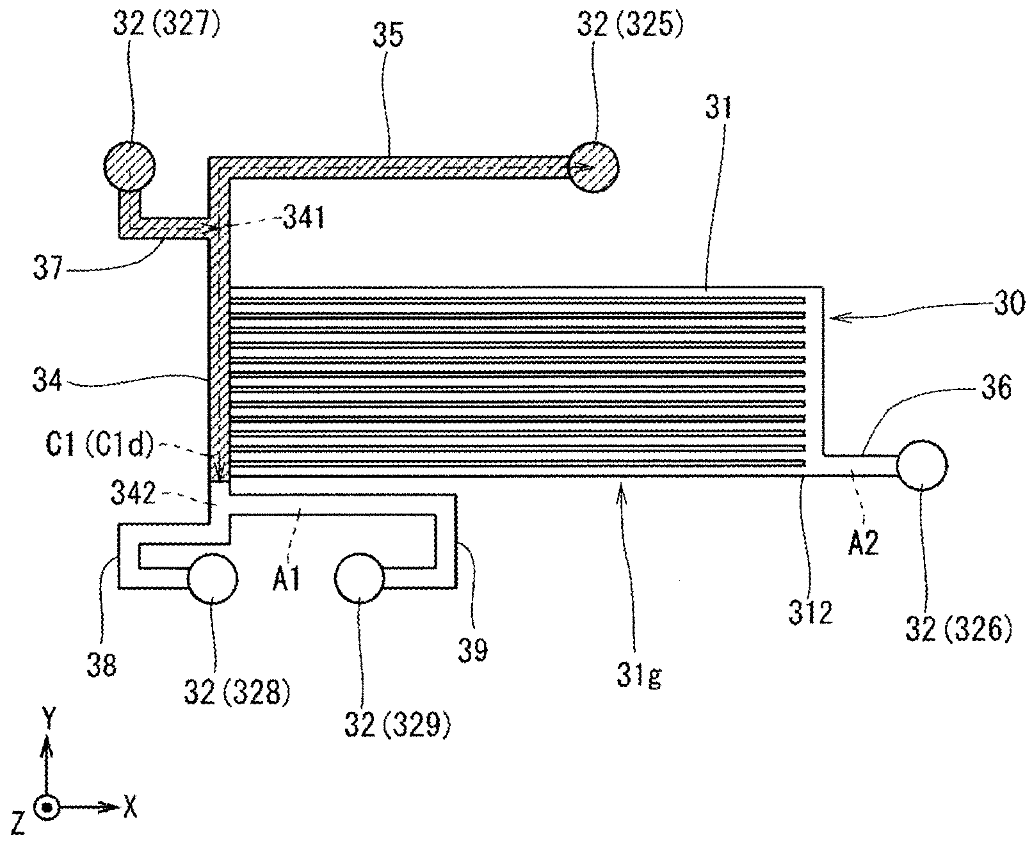
FIG. 22 is a schematic plan view of the first flow path device, illustrating its state in the first stage of the pretreatment process in the first example.

The pretreatment process may be performed by, for example, the first liquid feeder 4 and the liquid suction unit 5 being controlled by the controller 7. FIG. 22 is a schematic plan view of the first flow path device 3, illustrating its state in the first stage of the pretreatment process in the first example. In FIG. 22, as in FIG. 10 above, the outer edge of the first flow path device 3 is not illustrated, and the outer edges of the flow path portion 30, the two inlet holes 325 and 327, and the three outlet holes 326, 328, and 329 are drawn with solid lines. In FIG. 22, as in FIG. 10 above, the area with the pretreatment liquid is hatched with diagonal lines from the lower left to the upper right. In FIG. 22, as in FIG. 10 above, the direction in which the pretreatment liquid flows is further indicated by arrows drawn with thin two-dot-dash lines.

In step S122A in FIG. 21, determination is performed as to whether the pretreatment liquid reaches all the multiple connections C1 connected to the respective branch flow paths 31 in the main flow path 34. For example, this determination may be achieved by the controller 7 that determines whether the first predetermined period elapses from the start of the feeding operation performed by the first liquid feeder 4 or whether the feed amount of the pretreatment liquid fed by the first liquid feeder 4 reaches the first predetermined amount after the start of the feeding operation performed by the first liquid feeder 4. The first predetermined period and the first predetermined amount may be set based on, for example, the results of an experiment conducted using the first flow path device 3 or simulation with the first flow path device 3. flow path For example, the determination in step S122A is repeated until the pretreatment liquid reaches all the multiple connections C1. For example, the determination in step S122A is repeated until the first predetermined period elapses from the start of the feeding operation performed by the first liquid feeder 4 or until the feed amount of the pretreatment liquid fed by the first liquid feeder 4 reaches the first predetermined amount after the start of the feeding operation performed by the first liquid feeder 4.

When the pretreatment liquid reaches all the multiple connections C1, the processing advances to step S123. For example, the processing advances to step S123 when the first predetermined period elapses from the start of the feeding operation performed by the first liquid feeder 4 or when the feed amount of the pretreatment liquid fed by the first liquid feeder 4 reaches the first predetermined amount after the start of the feeding operation performed by the first liquid feeder 4.

As illustrated in FIG. 22, an area in the flow path portion 30 from the inlet hole 327 to a connection (also referred to as a most downstream connection) C1*d* at a most downstream end of the multiple connections C1 in the main flow path 34 is filled with the pretreatment liquid. For example, when the area from the inlet hole 327 to the most downstream connection C1*d* in the main flow path 34 is filled with the pretreatment liquid, the area from the inlet hole 327 to the most downstream connection C1*d* in the main flow path 34 may contain air bubbles or air without dividing the pretreatment liquid.

In this case, in step S123, the liquid suction unit 5 starts the sucking operation after the pretreatment liquid is fed by the first liquid feeder 4 through the inlet hole 327 to all the multiple connections C1 in the main flow path 34. In this structure as well, for example, the pretreatment liquid can start to fill each of the branch flow paths 31 immediately after the liquid suction unit 5 starts the sucking operation. This allows, for example, the relatively narrow branch flow paths 31 in the flow path portion 30 in the first flow path device 3 to be promptly filled with the pretreatment liquid.

For example, the liquid suction unit 5 may start the sucking operation at any timing after the first liquid feeder 4 starts the feeding operation or at the timing at which the first liquid feeder 4 starts the feeding operation. In other words, for example, in the pretreatment process, the liquid suction unit 5 may suck the pretreatment liquid from the main flow path 34 through the branch flow paths 31 and the outlet hole 326 at the first suction rate, while the first liquid feeder 4 is feeding the pretreatment liquid toward the main flow path 34 through the inlet hole 327 at the first feed rate. This fills the first area A1 and the second area A2 with the pretreatment liquid.

In this structure as well, in the flow path portion 30, the pretreatment liquid easily flows from the main flow path 34 to the flow paths 35, 38, and 39 with a larger width than the multiple branch flow paths 31. The pretreatment liquid also forcibly flows from the main flow path 34 to each of the branch flow paths 31 with the smaller width than the flow paths 35, 38, and 39 through the sucking operation performed by the liquid suction unit 5. For example, the liquid suction unit 5 such as a pump connected to the outlet hole 326 thus allows, for example, each of the relatively narrow branch flow paths 31 in the flow path portion 30 in the first flow path device 3 to be promptly filled with the pretreatment liquid. This allows, for example, each of the relatively narrow branch flow paths 31 in the flow path portion 30 in the first flow path device 3 to be easily filled with the pretreatment liquid.

Figure 23:
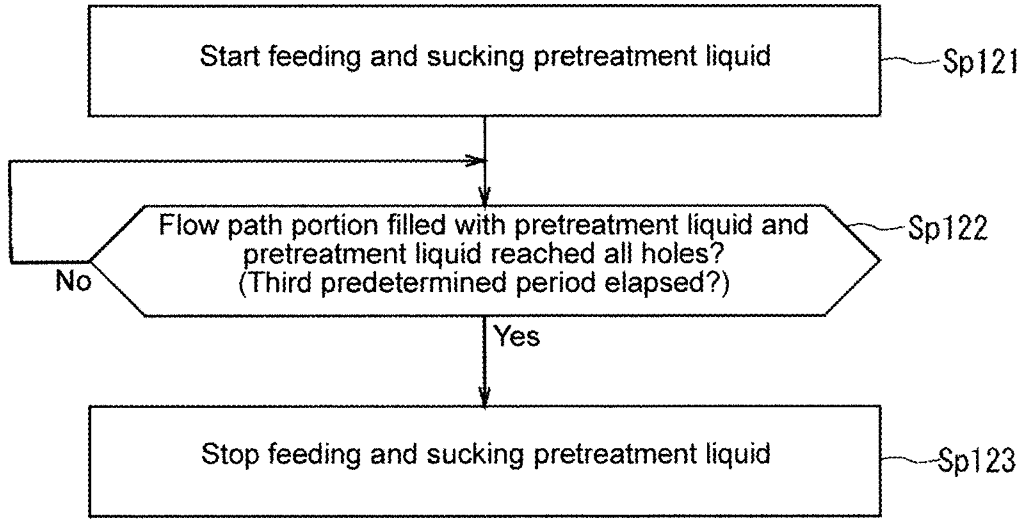
FIG. 23 is a flowchart of processing in another pretreatment process in a second example.

FIG. 23 is a flowchart of processing in another example (also referred to as a second example) of the pretreatment process performed in step S12 in FIG. 6 described above. In this example, the pretreatment process in step S12 includes, for example, step Sp121 to step Sp123 performed in the stated order as illustrated in FIG. 23. The pretreatment process may be performed by, for example, the first liquid feeder 4 and the liquid suction unit 5 being controlled by the controller 7.

In step Sp121, the first liquid feeder 4 starts the feeding operation of feeding the pretreatment liquid toward the main flow path 34 through the inlet hole 327, and the liquid suction unit 5 simultaneously starts the sucking operation of sucking the pretreatment liquid from the main flow path 34 through the branch flow paths 31 and the outlet hole 326. Thus, the liquid suction unit 5 sucks the pretreatment liquid from the main flow path 34 through the branch flow paths 31 and the outlet hole 326 at the first suction rate, while the first liquid feeder 4 is feeding the pretreatment liquid toward the main flow path 34 through the inlet hole 327 at the first feed rate.

In step Sp122, determination is performed as to whether the flow path portion 30 is filled with the pretreatment liquid and the pretreatment liquid reaches all the holes 32 in the first flow path device 3. This determination may be achieved by, for example, the controller 7 that determines whether a third predetermined period elapses from the start of the sucking operation performed by the liquid suction unit 5 or the start of the feeding operation performed by the first liquid feeder 4. The third predetermined period may be set based on, for example, the results of an experiment conducted using the first flow path device 3 or simulation with the first flow path device 3.

For example, the determination in step Sp122 is repeated until the flow path portion 30 is filled with the pretreatment liquid and the pretreatment liquid reaches all the holes 32 in the first flow path device 3. For example, the determination in step Sp122 is repeated until the third predetermined period elapses from the start of the sucking operation performed by the liquid suction unit 5 or the start of the feeding operation performed by the first liquid feeder 4.

When the flow path portion 30 is filled with the pretreatment liquid and the pretreatment liquid reaches all the holes 32 in the first flow path device 3, the processing advances to step Sp123. For example, the processing advances to step Sp123 when the third predetermined period elapses from the start of the sucking operation performed by the liquid suction unit 5 or the start of the feeding operation performed by the first liquid feeder 4. The first area A1 from the inlet hole 327 through the main flow path 34 to the two outlet holes 328 and 329 and the second area A2 from the main flow path 34 through each of the branch flow paths 31 to the outlet hole 326 are filled with the pretreatment liquid.

In step Sp123, the feeding operation performed by the first liquid feeder 4 and the sucking operation performed by the liquid suction unit 5 are stopped.

Figure 24:
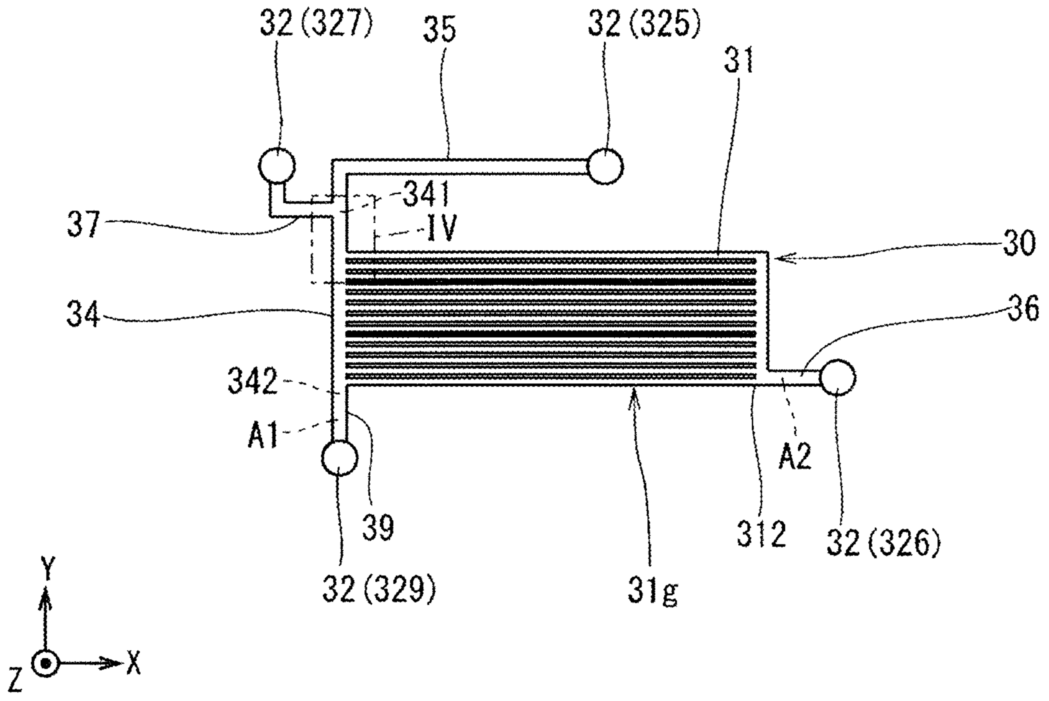
FIG. 24 is a schematic plan view of the flow path portion and the multiple holes in the first flow path device, illustrating their other example structures.

In each of the above embodiments, as illustrated in FIG. 24, the flow path portion 30 and the multiple holes 32 may not include, for example, the flow path 38 as the seventh flow path and the outlet hole 328 as the third outlet hole. FIG. 24 is a schematic plan view of the flow path portion 30 and the multiple holes 32 in the first flow path device 3, illustrating their other example structures. In FIG. 24, the outer edge of the first flow path device 3 is not illustrated, and the outer edges of the flow path portion 30, the two inlet holes 325 and 327, and the two outlet holes 326 and 329 are drawn with solid lines. For example, the flow path 39 as the fifth flow path may extend in the negative Y-direction as the first direction, similarly to the main flow path 34. The main flow path 34 may include, for example, the flow path 39 as the fifth flow path.

Figure 25:
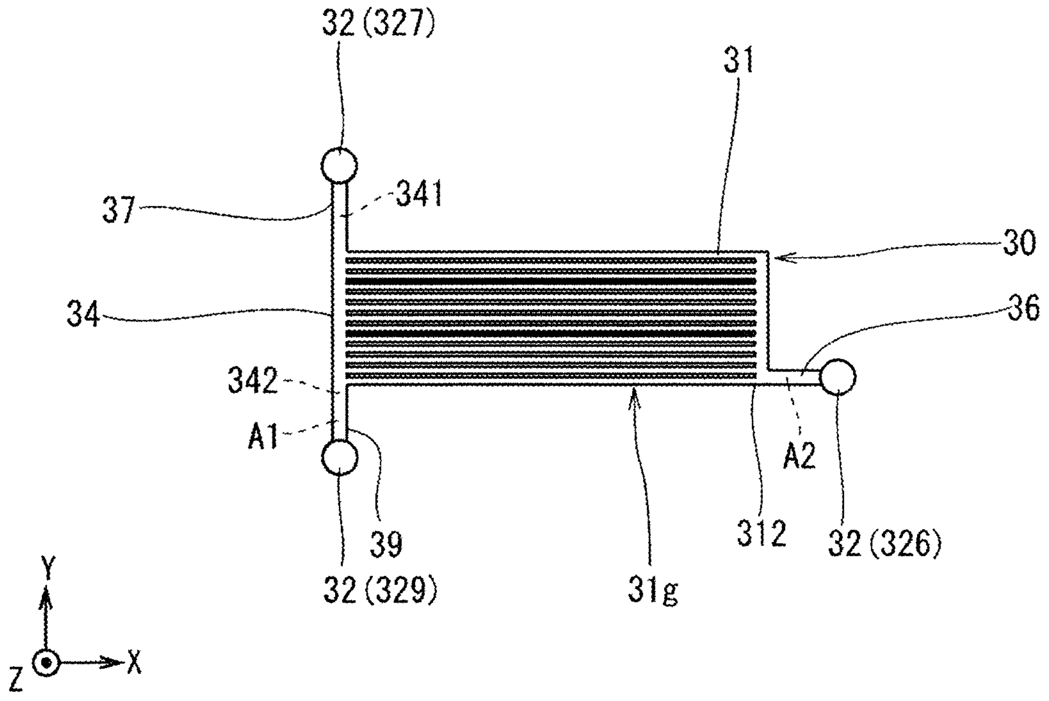
FIG. 25 is a schematic plan view of the flow path portion and the multiple holes in the first flow path device, illustrating their other example structures.

As illustrated in FIG. 25, the flow path portion 30 and the multiple holes 32 may not include, for example, the flow path 38 as the seventh flow path, the outlet hole 328 as the third outlet hole, the flow path 35 as the fourth flow path, and the inlet hole 325 as the second inlet hole. FIG. 25 is a schematic plan view of the flow path portion 30 and the holes 32 in the first flow path device 3, illustrating their other example structures. In FIG. 25, the outer edge of the first flow path device 3 is not illustrated, and the outer edges of the flow path portion 30, the inlet hole 325, and the two outlet holes 326 and 329 are drawn with solid lines. For example, the inlet hole 327 as the first inlet hole may be used to feed both the pretreatment liquid and the processing target liquid. For example, after the pretreatment process is complete, the second liquid feeder 6 may be connected to the inlet hole 327. For example, the flow path 37 as the third flow path and the flow path 39 as the fifth flow path may extend, for example, in the negative Y-direction as the first direction, similarly to the main flow path 34. For example, the main flow path 34 may include the flow path 37 as the third flow path or the flow path 39 as the fifth flow path.

When the first flow path device 3 includes the flow path portion 30 and the multiple holes 32 as illustrated in FIG. 24 or FIG. 25, for example, in the pretreatment process as the second process, the liquid suction unit 5 starts the sucking operation after the pretreatment liquid is fed by the first liquid feeder 4 from the inlet hole 327 through the main flow path 34 to the outlet hole 329. For example, in step S122, determination is performed as to whether the pretreatment liquid reaches the outlet hole 329. For example, this determination may be achieved by the controller 7 that determines whether the first predetermined period elapses from the start of the feeding operation performed by the first liquid feeder 4 or whether the feed amount of the pretreatment liquid fed by the first liquid feeder 4 reaches the first predetermined amount after the start of the feeding operation performed by the first liquid feeder 4. The first predetermined period and the first predetermined amount may be set based on, for example, the results of an experiment conducted using the first flow path device 3 or simulation with the first flow path device 3. This allows, for example, each of the relatively narrow branch flow paths 31 in the flow path portion 30 in the first flow path device 3 to be easily filled with the pretreatment liquid.

In this case, in step S12 in the pretreatment process, the determination in step S122 is repeated until the pretreatment liquid reaches the outlet hole 329. For example, the determination in step S122 is repeated until the first predetermined period elapses from the start of the feeding operation performed by the first liquid feeder 4 or until the feed amount of the pretreatment liquid fed by the first liquid feeder 4 reaches the first predetermined amount after the start of the feeding operation performed by the first liquid feeder 4. When the pretreatment liquid reaches the outlet hole 329, the processing advances to step S123. For example, the processing advances to step S123 when the first predetermined period elapses from the start of the feeding operation performed by the first liquid feeder 4 or when the feed amount of the pretreatment liquid fed by the first liquid feeder 4 reaches the first predetermined amount after the start of the feeding operation performed by the first liquid feeder 4. The first area A1 from the inlet hole 327 through the main flow path 34 to the outlet hole 329 is thus filled with the pretreatment liquid.

For example, when the first area A1 includes the outlet hole 329 and when the first area A1 is filled with the pretreatment liquid, each of the flow paths and each of the holes 32 in the first area A1 may contain air bubbles or air without dividing the pretreatment liquid. For example, when the first area A1 does not include the outlet hole 329 and when the first area A1 is filled with the pretreatment liquid, each of the flow paths and the inlet hole 327 may contain air bubbles or air without dividing the pretreatment liquid.

When the first flow path device 3 includes the flow path portion 30 and the multiple holes 32 illustrated in FIG. 24, for example, in the pretreatment process as the second process, the liquid suction unit 5 starts the sucking operation after the pretreatment liquid is fed by the first liquid feeder 4 from the inlet hole 327 through the main flow path 34 to the outlet hole 329 and the inlet hole 325. For example, in step S122, determination may be performed as to whether the pretreatment liquid reaches the outlet hole 329 and the inlet hole 325. For example, this determination may be achieved by the controller 7 that determines whether the first predetermined period elapses from the start of the feeding operation performed by the first liquid feeder 4 or whether the feed amount of the pretreatment liquid fed by the first liquid feeder 4 reaches the first predetermined amount after the start of the feeding operation performed by the first liquid feeder 4. The first predetermined period and the first predetermined amount may be set based on, for example, the results of an experiment conducted using the first flow path device 3 or simulation with the first flow path device 3.

In this case, in step S12 in the pretreatment process, the determination in step S122 is repeated until the pretreatment liquid reaches the outlet hole 329 and the inlet hole 325. For example, the determination in step S122 is repeated until the first predetermined period elapses from the start of the feeding operation performed by the first liquid feeder 4 or until the feed amount of the pretreatment liquid fed by the first liquid feeder 4 reaches the first predetermined amount after the start of the feeding operation performed by the first liquid feeder 4. When the pretreatment liquid reaches the outlet hole 329 and the inlet hole 325, the processing advances to step S123. For example, the processing advances to step S123 when the first predetermined period elapses from the start of the feeding operation performed by the first liquid feeder 4 or when the feed amount of the pretreatment liquid fed by the first liquid feeder 4 reaches the first predetermined amount after the start of the feeding operation performed by the first liquid feeder 4. The first area A1 from the inlet hole 327 through the main flow path 34 to the outlet hole 329 and the inlet hole 325 may thus be filled with the pretreatment liquid.

For example, when the first area A1 includes the outlet hole 329 and the inlet hole 325 and when the first area A1 is filled with the pretreatment liquid, each of the flow paths and each of the holes 32 in the first area A1 may contain air bubbles or air without dividing the pretreatment liquid. For example, when the first area A1 does not include the outlet hole 329 or the inlet hole 325 and when the first area A1 is filled with the pretreatment liquid, each of the flow paths and the inlet hole 327 in the first area A1 may contain air bubbles or air without dividing the pretreatment liquid.

In each of the above embodiments, in step S122, determination may be performed as to whether the pretreatment liquid reaches the two outlet holes 328 and 329 and the inlet hole 325. For example, this determination may be achieved by the controller 7 that determines whether the first predetermined period elapses from the start of the feeding operation performed by the first liquid feeder 4 or whether the feed amount of the pretreatment liquid fed by the first liquid feeder 4 reaches the first predetermined amount after the start of the feeding operation performed by the first liquid feeder 4. The first predetermined period and the first predetermined amount may be set based on, for example, the results of an experiment conducted using the first flow path device 3 or simulation with the first flow path device 3.

In this case, in step S12 in the pretreatment process, the determination in step S122 is repeated until the pretreatment liquid reaches the two outlet holes 328 and 329 and the inlet hole 325. For example, the determination in step S122 is repeated until the first predetermined period elapses from the start of the feeding operation performed by the first liquid feeder 4 or until the feed amount of the pretreatment liquid fed by the first liquid feeder 4 reaches the first predetermined amount after the start of the feeding operation performed by the first liquid feeder 4. When the pretreatment liquid reaches the two outlet holes 328 and 329 and the inlet hole 325, the processing advances to step S123. For example, the processing advances to step S123 when the first predetermined period elapses from the start of the feeding operation performed by the first liquid feeder 4 or when the feed amount of the pretreatment liquid fed by the first liquid feeder 4 reaches the first predetermined amount after the start of the feeding operation performed by the first liquid feeder 4. The first area A1 from the inlet hole 327 through the main flow path 34 to the two outlet holes 328 and 329 and the inlet hole 325 is thus filled with the pretreatment liquid.

For example, when the first area A1 includes the two outlet holes 328 and 329 and the inlet hole 325 and when the first area A1 is filled with the pretreatment liquid, each of the flow paths and each of the holes 32 in the first area A1 may contain air bubbles or air without dividing the pretreatment liquid. For example, when the first area A1 does not include the two outlet holes 328 and 329 or the inlet hole 325 and when the first area A1 is filled with the pretreatment liquid, each of the flow paths and the inlet hole 327 in the first area A1 may contain air bubbles or air without dividing the pretreatment liquid.

In each of the above embodiments, for example, when the first feed rate is greater than the first suction rate, the flow path portion 30 can be filled with the pretreatment liquid more promptly.

In the first embodiment described above, for example, at least one hole selected from the inlet holes 325 and 327 and the outlet holes 326, 328, and 329 may not be open in the first lower surface 3*b* and may be open in the first upper surface 3*a*. In other words, for example, the two inlet holes 325 and 327 and the three outlet holes 326, 328, and 329 may each be open in the first upper surface 3*a* or the first lower surface 3*b*. In the first embodiment described above, a unit for introducing the processing target liquid is a pair of the inlet hole 325 and the flow path 35, and a unit for introducing the pressing liquid is a pair of the inlet hole 327 and the flow path 37. Two or more of the units for introducing the processing target liquid, two or more of the units for introducing the pressing liquid, or two or more of both the units may be included. In this case, each of the units is to be appropriately connected to the main flow path 34 to allow the first flow path device 3 to function as a separating device.

In the first embodiment described above, for example, in the example first flow path device 3 illustrated in FIG. 24, at least one hole selected from the two inlet holes 325 and 327 and the two outlet holes 326 and 329 may not be open in the first lower surface 3*b* and may be open in the first upper surface 3*a*. In other words, for example, the two inlet holes 325 and 327 and the two outlet holes 326 and 329 may each be open in the first upper surface 3*a* or the first lower surface 3*b*.

In the first embodiment described above, in the example of the first flow path device 3 illustrated in FIG. 25, at least one hole selected from the inlet hole 327 and the two outlet holes 326 and 329 may not be open in the first lower surface 3*b* and may be open in the first upper surface 3*a*. In other words, for example, the inlet hole 327 and the two outlet holes 326 and 329 may each be open in either the first upper surface 3*a* or the first lower surface 3*b*.

In the first embodiment described above, for example, the flow path portion 30 in the first flow path device 3 may be a flow path portion configured to mix multiple liquids, rather than a flow path portion for separating a specific component in the processing target liquid.

In the second embodiment described above, for example, the flow path portion 30 may be a groove that is not open in the first upper surface 3*a* and is open in the first lower surface 3*b*. In this case, the first lower surface 3*b* of the first flow path device 3 is in contact with the third upper surface 2*a* excluding portions with the two inlet holes 325 and 327, the three outlet holes 326, 328, and 329, and the flow path portion 30. A fluid does not move in a portion between the first lower surface 3*b* and the third upper surface 2*a* in contact with each other. The flow path portion 30 is used together with the third upper surface 2*a* to allow the fluid to move. The first flow path device 3 may include, for example, the connection member 2. In the structure with the connection member 2, for example, the flow path portion 30 is not open in the outer surface of the first flow path device 3. For example, the inlet hole 327 as the first inlet hole may include the through-hole 227. For example, the inlet hole 325 as the second inlet hole may include the through-hole 225. For example, the outlet hole 329 as the first outlet hole may include the through-hole 229. For example, the outlet hole 326 as the second outlet hole may include the through-hole 226. For example, the outlet hole 328 as the third outlet hole may include the through-hole 228. In this case, for example, the two inlet holes 325 and 327 and the three outlet holes 326, 328, and 329 are each continuous with the flow path portion 30 and are open in the outer surface of the first flow path device 3.

The connection member 2 and the first flow path device 3 may be, for example, less flexible. For example, the first flow path device 3 made of PDMS and the connection member 2 made of a silicone resin are both flexible. The second flow path device 1 made of a COP is less flexible and is less likely to deteriorate the function of the first flow path device 3. The second flow path device 1 made of, for example, a material that is not easily bonded directly to the material for the first flow path device 3 may be bonded to the first flow path device 3 easily with the connection member 2.

In the second embodiment, for example, the second flow path device 1 may include at least the measurement flow path 151 of the multiple flow paths 1*f*. In this case, for example, the first flow path device 3 may not be stacked on the second flow path device 1, and the outlet hole 329 in the first flow path device 3 and the inlet hole 129 in the second flow path device 1 may be connected to each other through, for example, a tube. In the first flow path device 3, the processing target liquid may be introduced into the inlet hole 325 through, for example, the tube 6*c*, and the pressing liquid may be introduced into the inlet hole 327 through, for example, the tube 4*c*. In the first flow path device 3, the non-target particles P200 may be discharged through the outlet hole 326 through, for example, the tube 5*c*, and the remaining component of the processing target liquid other than the non-target particles P200 and the separating target particles P100 may be discharged through the outlet hole 328 through, for example, a tube.

In the second embodiment described above, for example, the measurement flow path 151 may not be continuous with the outlet hole 143 through the flow path 119 and may be directly connected to the outlet hole 143. In other words, the outlet hole 143 may be directly connected to the second end area E2 in the measurement flow path 151. In this structure as well, the outlet hole 143 is continuous with the second end area E2 in the measurement flow path 151.

In the second embodiment described above, for example, the first flow path device 3 may not be located on the second flow path device 1 with the connection member 2 between the first flow path device 3 and the second flow path device 1. In this case, for example, the first lower surface 3*b* of the first flow path device 3 may be in contact with the second upper surface 1*a* of the second flow path device 1. For example, the three inlet holes 126, 128, and 129 and the two outlet holes 125 and 127 in the second flow path device 1 may be connected to the three outlet holes 326, 328, and 329 and the two inlet holes 325 and 327 in the first flow path device 3 through, for example, tubes. For example, the inlet hole 129 may be open in either the second upper surface 1*a* or the second lower surface 1*b*.

In the second embodiment described above, for example, the mixing-fluid hole 123 may not be open in the first surface 11*a* as the second upper surface 1*a* and may be open in the fourth surface 12*b* as the second lower surface 1*b*.

When, for example, the separating target particles P100 undergo optical measurement as example predetermined processing, the separating device 100 in the second embodiment described above may be an optical measurement device with an optical sensor unit as an additional component. In this case, the optical sensor unit may be, for example, a light sensor including a light emitter and a light receiver. The light emitter may be, for example, a light-emitting element such as a light-emitting diode (LED) or a laser diode (LD). The light receiver may be, for example, a light-receiving element such as a photodiode (PD). The light-receiving element may be, for example, an element including a semiconductor substrate of a first conductivity type having a semiconductor region of a second conductivity type in a surface layer near an upper surface of the semiconductor substrate. The light-emitting element may be, for example, an element including the semiconductor substrate described above and multiple semiconductor layers stacked on the semiconductor substrate. In this structure, light emitted from the light emitter may transmit through the sample in the measurement flow path 151 and may be received by the light receiver. Light emitted from the light emitter may transmit through the dispersing liquid in the reference flow path 152 and may be received by the light receiver. The light emitter and the light receiver in the optical sensor unit may be elements integral with a single semiconductor substrate as described above, or the light emitter and the light receiver may be an integral element placed on a single substrate. The optical sensor unit including the light emitter and the light receiver integral with each other on a single substrate can downsize the optical sensor unit and shorten the focal length of the optical sensor unit, thus allowing accurate measurement of microscopic areas. The optical sensor unit may be held by, for example, an actuator in a movable manner between a position facing the measurement flow path 151 and a position facing the reference flow path 152. The optical measurement device may include a controller for controlling the operation of the optical sensor unit. The controller may control the operation of the actuator that moves the optical sensor unit. The controller may perform various computation processes based on a signal received from the light receiver that outputs the signal in response to receiving light. The controller 7 may have the function of this controller.

In each of the above embodiments, the widths of the five flow paths 35, 36, 37, 38, and 39 may each not be constant in the upstream portion to the downstream portion. For example, the flow path 35 may include a portion with a width being narrower in a continuous or a stepwise manner from the inlet hole 325 to the main flow path 34. For example, the flow path 37 may include a portion with a width being narrower in a continuous or a stepwise manner from the inlet hole 327 to the main flow path 34. For example, the flow path 38 may include a portion with a width being wider in a continuous or a stepwise manner from the main flow path 34 to the outlet hole 328. For example, the flow path 39 may include a portion with a width being wider in a continuous or a stepwise manner from the main flow path 34 to the outlet hole 329.

In each of the above embodiments, the material for the second flow path device 1 may be an acrylic resin, polycarbonate (PC), or a COP. An acrylic resin may be, for example, polymethyl methacrylate (PMMA).

In each of the above embodiments, for example, the processing target liquid may be a liquid containing multiple types of particles other than blood. In this case, the pretreatment liquid, the pressing liquid, the dispersing liquid, and the mixing fluid may each be, for example, any of various liquids corresponding to the processing target liquid. The various liquids may include, for example, water.

The components described in the above embodiments and the variations may be entirely or partially combined as appropriate unless any contradiction arises.

The invention claimed is:

1. A method for preparing a flow path device including a flow path portion not open in an outer surface of the flow path device, a plurality of holes each being continuous with the flow path portion and being open in the outer surface, the flow path portion including a first flow path and a plurality of second flow paths each connected to the first flow path and being narrower than the first flow path, the plurality of holes including a first inlet hole continuous with a first upstream portion in the first flow path, a first outlet hole continuous with a first downstream portion in the first flow path, and a second outlet hole continuous with a second downstream portion in each of the plurality of second flow paths, the second downstream portion being opposite to the first flow path, the method comprising:

connecting a liquid feeder to the first inlet hole, the liquid feeder being configured to feed a liquid toward the first flow path through the first inlet hole, and connecting a liquid suction unit to the second outlet hole, the liquid suction unit being configured to suck the liquid from the first flow path through the plurality of second flow paths and the second outlet hole; and sucking, with the liquid suction unit, the liquid from the first flow path through the plurality of second flow paths and the second outlet hole at a first suction rate being lower than or equal to a first feed rate while feeding, with the liquid feeder, the liquid toward the first flow path through the first inlet hole at the first feed rate, and filling a first area and a second area with the liquid, the first area extending from the first inlet hole through the first flow path to the first outlet hole, the second area extending from the first flow path through each of the plurality of second flow paths to the second outlet hole.

2. The method according to claim 1, wherein the sucking includes starting a sucking operation after the liquid feeder feeds, through the first inlet hole, the liquid to each of a plurality of connections included in the first flow path, each of the plurality of connections is connected to a corresponding second flow path of the plurality of second flow paths, and the sucking operation is an operation to suck, with the liquid suction unit, the liquid from the first flow path through the plurality of second flow paths and the second outlet hole.

3. The method according to claim 1, wherein the sucking includes starting a sucking operation after the liquid feeder feeds the liquid from the first inlet hole through the first flow path to the first outlet hole, and the sucking operation is an operation to suck, with the liquid suction unit, the liquid from the first flow path through the plurality of second flow paths and the second outlet hole.

4. The method according to claim 1, wherein the plurality of holes includes a second inlet hole being continuous with the first upstream portion, the first flow path is a straight flow path extending in a first direction, each of the plurality of second flow paths is open in a side surface of the first flow path located in a second direction between the first upstream portion and the first downstream portion, the second direction is orthogonal to the first direction, and the flow path portion includes a third flow path and a fourth flow path, the third flow path connects the first inlet hole and the first upstream portion and includes a portion connected to the first upstream portion, the portion connected to the first upstream portion is open in a side surface of the first flow path opposite to the side surface of the first flow path located in the second direction, the fourth flow path connects the second inlet hole and the first upstream portion and includes a portion connected to the first upstream portion, and the portion connected to the first upstream portion extends in the first direction.

5. The method according to claim 4, wherein the plurality of holes includes a third outlet hole being continuous with the first downstream portion, and the flow path portion includes a fifth flow path connecting the first outlet hole and the first downstream portion and including a portion connected to the first downstream portion, and the portion connected to the first downstream portion is open in a side surface of the first downstream portion located in the second direction.

6. The method according to claim 2, wherein the sucking includes starting a sucking operation after the liquid feeder feeds the liquid from the first inlet hole through the first flow path to the first outlet hole, and the sucking operation is an operation to suck, with the liquid suction unit, the liquid from the first flow path through the plurality of second flow paths and the second outlet hole.

7. The method according to claim 2, wherein the plurality of holes includes a second inlet hole being continuous with the first upstream portion, the first flow path is a straight flow path extending in a first direction, each of the plurality of second flow paths is open in a side surface of the first flow path located in a second direction between the first upstream portion and the first downstream portion, the second direction is orthogonal to the first direction, and the flow path portion includes a third flow path and a fourth flow path, the third flow path connects the first inlet hole and the first upstream portion and includes a portion connected to the first upstream portion, the portion connected to the first upstream portion is open in a side surface of the first flow path opposite to the side surface of the first flow path located in the second direction, the fourth flow path connects the second inlet hole and the first upstream portion and includes a portion connected to the first upstream portion, and the portion connected to the first upstream portion extends in the first direction.

8. The method according to claim 3, wherein the plurality of holes includes a second inlet hole being continuous with the first upstream portion, the first flow path is a straight flow path extending in a first direction, each of the plurality of second flow paths is open in a side surface of the first flow path located in a second direction between the first upstream portion and the first downstream portion, the second direction is orthogonal to the first direction, and the flow path portion includes a third flow path and a fourth flow path, the third flow path connects the first inlet hole and the first upstream portion and includes a portion connected to the first upstream portion, the portion connected to the first upstream portion is open in a side surface of the first flow path opposite to the side surface of the first flow path located in the second direction, the fourth flow path connects the second inlet hole and the first upstream portion and includes a portion connected to the first upstream portion, and the portion connected to the first upstream portion extends in the first direction.

9. The method according to claim 6, wherein the plurality of holes includes a second inlet hole being continuous with the first upstream portion, the first flow path is a straight flow path extending in a first direction, each of the plurality of second flow paths is open in a side surface of the first flow path located in a second direction between the first upstream portion and the first downstream portion, the second direction is orthogonal to the first direction, and the flow path portion includes a third flow path and a fourth flow path, the third flow path connects the first inlet hole and the first upstream portion and includes a portion connected to the first upstream portion, the portion connected to the first upstream portion is open in a side surface of the first flow path opposite to the side surface of the first flow path located in the second direction, the fourth flow path connects the second inlet hole and the first upstream portion and includes a portion connected to the first upstream portion, and the portion connected to the first upstream portion extends in the first direction.

10. The method according to claim 7, wherein the plurality of holes includes a third outlet hole being continuous with the first downstream portion, and the flow path portion includes a fifth flow path connecting the first outlet hole and the first downstream portion and including a portion connected to the first downstream portion, and the portion connected to the first downstream portion is open in a side surface of the first downstream portion located in the second direction.

11. The method according to claim 8, wherein the plurality of holes includes a third outlet hole being continuous with the first downstream portion, and the flow path portion includes a fifth flow path connecting the first outlet hole and the first downstream portion and including a portion connected to the first downstream portion, and the portion connected to the first downstream portion is open in a side surface of the first downstream portion located in the second direction.

12. The method according to claim 9, wherein the plurality of holes includes a third outlet hole being continuous with the first downstream portion, and the flow path portion includes a fifth flow path connecting the first outlet hole and the first downstream portion and including a portion connected to the first downstream portion, and the portion connected to the first downstream portion is open in a side surface of the first downstream portion located in the second direction.

* * * * *